US012777444B2

(12) United States Patent

Zang et al.

(10) Patent No.: US 12,777,444 B2

(45) Date of Patent: Oct. 27, 2026

(54) TIMING METHOD AND COMMUNICATION APPARATUS

(71) Applicant: HUAWEI TECHNOLOGIES CO., LTD., Shenzhen (CN)

(72) Inventors: Xin Zang, Shanghai (CN); Runze Zhou, Shanghai (CN); Yuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 18/785,607

(22) Filed: Jul. 26, 2024

(65) Prior Publication Data

US 2024/0389042 A1 Nov. 21, 2024

Related U.S. Application Data

(63) Continuation of application No. PCT/CN2023/072630, filed on Jan. 17, 2023.

(30) Foreign Application Priority Data

Jan. 30, 2022 (CN) ......................... 202210114574.6

(51) Int. Cl.
*H04W 56/00* (2009.01)

(52) U.S. Cl.
CPC ..... *H04W 56/005* (2013.01); *H04W 56/0015* (2013.01); *H04W 56/009* (2013.01)

(58) Field of Classification Search
CPC ........... H04W 56/005; H04W 56/0015; H04W 56/009; H04W 4/80; H04W 56/001
See application file for complete search history.

(56) References Cited

U.S. PATENT DOCUMENTS 12,019,580 B2 * 6/2024 Hyakudai ........... G06F 13/4282
2016/0117101 A1 * 4/2016 Choi ..................... G06F 3/0688 711/105

(Continued)

FOREIGN PATENT DOCUMENTS

CN 110167132 A 8/2019
CN 113518421 A 10/2021

OTHER PUBLICATIONS

IEEE Std 1588™—2008. IEEE Standard for a Precision Clock Synchronization Protocol for Networked Measurement and Control Systems,IEEE Instrumentation and Measurement Society, Sponsored by the Technical Committee on Sensor Technology (TC-9). Jul. 24, 2008,total 289 pages.

(Continued)

*Primary Examiner* — Richard T Torrente

(74) *Attorney, Agent, or Firm* — WOMBLE BOND DICKINSON (US) LLP

(57) ABSTRACT

Embodiments of this application provide a timing method and a communication apparatus. The method includes: A clock management network element receives a clock request message from at least one terminal device. The clock request message includes an identifier of the terminal device and timing precision requested by the terminal device, and the at least one terminal device includes a second terminal device that requests first timing precision. The clock management network element determines that a first clock deployed on a first terminal device meets the first timing precision. The clock management network element sends first timing configuration information to the first terminal device. The first timing configuration information includes an identifier of the second terminal device. This application can optimize a manner in which the first terminal device performs timing (Continued)

for the second terminal device, to implement timing information isolation.

19 Claims, 5 Drawing Sheets

(56) References Cited

U.S. PATENT DOCUMENTS

| | | | | |
|---|---|---|---|---|
| 2019/0037018 | A1* | 1/2019 | Scurrell | H04L 67/10 |
| 2020/0413360 | A1* | 12/2020 | Ruffini | H04W 56/0015 |
| 2021/0219253 | A1* | 7/2021 | Van Phan | H04L 41/0894 |
| 2022/0007317 | A1* | 1/2022 | Kitagawa | H04W 56/003 |
| 2022/0376805 | A1* | 11/2022 | Uhling | H04W 56/0015 |
| 2022/0377793 | A1* | 11/2022 | Uhling | H04W 40/244 |

OTHER PUBLICATIONS

3GPP TS 23.501 V17.2.0 (Sep. 2021),3rd Generation Partnership Project;Technical Specification Group Services and System Aspects-;System architecture for the 5G System (5GS);Stage 2 (Release 17),total 526 pages.

* cited by examiner

TIMING METHOD AND COMMUNICATION APPARATUS

CROSS-REFERENCE TO RELATED APPLICATIONS

This application is a continuation of International Application No. PCT/CN2023/072630, filed on Jan. 17, 2023, which claims priority to Chinese Patent Application No. 202210114574.6, filed on Jan. 30, 2022. The disclosures of the aforementioned applications are hereby incorporated by reference in their entireties.

TECHNICAL FIELD

Embodiments of this application relate to the communication field, and more specifically, to a timing method and a communication apparatus.

BACKGROUND

In a wireless communication system, user equipments (UEs) may directly communicate with each other without using a network device, and an interface for direct communication between UEs is referred to as a PC5 interface. The PC5 interface may alternatively be used for device-to-device (D2D) communication and vehicle-to-everything (V2X) communication. For example, in the V2X communication, each vehicle is one UE. Because data transmission may be directly performed between UEs without using a network, a communication delay can be effectively reduced.

If one of two UEs that can directly communicate with each other is deployed with at least one clock, and the other UE has a timing requirement, the UE deployed with the clock may perform timing for the UE that has the timing requirement.

SUMMARY

Embodiments of this application provide a timing method, to optimize a timing manner.

According to a first aspect, a timing method is provided. The method includes: A clock management network element receives a clock request message from at least one terminal device. The clock request message includes an identifier of the terminal device and timing precision requested by the terminal device, and the at least one terminal device includes a second terminal device that requests first timing precision. The clock management network element determines that a first clock deployed on a first terminal device meets the first timing precision. The clock management network element sends first timing configuration information to the first terminal device. The first timing configuration information includes an identifier of the second terminal device.

If timing precision of the first clock deployed on the first terminal device is the same as the first timing precision, or timing precision of the first clock deployed on the first terminal device is higher than the first timing precision, it indicates that the first clock deployed on the first terminal device meets the first timing precision.

Based on the foregoing technical solution, when determining that the first clock that meets the first timing precision is deployed on the first terminal device, the clock management network element sends the first timing configuration information to the first terminal device. The first timing configuration information includes the identifier of the second terminal device that requests the first timing precision. Therefore, the first terminal device can send information about the first clock in a first terminal device group based on the first timing configuration information. The first terminal device group includes the first terminal device and the second terminal device. It may be understood that the first terminal device sends the information about the first clock in the first terminal device group, and the first terminal device group includes the second terminal device that requests the first timing precision. Therefore, the first terminal device sends the information about the first clock to the second terminal device that requests the first timing precision, and does not send the information about the first clock to a terminal device that does not request the first timing precision, to optimize a manner in which the first terminal device performs timing for the second terminal device and implement timing information isolation. The information about the first clock is used as reference clock information (or reference time information) to perform timing for the second terminal device, and the information about the first clock may also be referred to as the timing information.

With reference to the first aspect, in some embodiments of the first aspect, the method further includes: The clock management network element determines a first terminal device group based on the clock request message. The first terminal device group includes the first terminal device and a terminal device that requests the first timing precision in the at least one terminal device, and the terminal device that requests the first timing precision in the at least one terminal device includes the second terminal device. The first timing configuration information indicates to send information about the first clock in the first terminal device group, and the first timing configuration information includes an identifier of the terminal device that requests the first timing precision in the at least one terminal device.

Based on the foregoing technical solution, the clock management network element determines the first terminal device group, and indicates, by using the first timing configuration information, to send the information about the first clock in the first terminal device group, so that the first terminal device can directly determine, based on the first timing configuration information, to send the information about the first clock in the first terminal device group, without increasing processing load of the first terminal device.

With reference to the first aspect, in some embodiments of the first aspect, the method further includes: The clock management network element determines, based on subscription information of the second terminal device, that the second terminal device subscribes to a clock service of the first timing precision.

The subscription information of the second terminal device includes a clock service subscribed by the second terminal device.

Based on the foregoing technical solution, the clock management network element may determine, based on the subscription information of the second terminal device, that the second terminal device subscribes to the clock service of the first timing precision, to avoid providing the second terminal device with a clock service that is of high timing precision and that is not subscribed to by the second terminal device, and further implement the timing information isolation.

With reference to the first aspect, in some embodiments of the first aspect, the method further includes: The clock management network element sends an identifier of the first terminal device to the second terminal device.

Based on the foregoing technical solution, the clock management network element sends the identifier of the first terminal device to the second terminal device, so that the second terminal device can request timing from the first terminal device based on the identifier of the first terminal device, instead of requesting timing from another terminal device, to avoid a case in which the second terminal device obtains information about a clock that is not needed by the second terminal device, and implement the timing information isolation.

With reference to the first aspect, in some embodiments of the first aspect, the method further includes: The clock management network element obtains first security information. The first security information is obtained from the first terminal device. The clock management network element sends the first security information to the second terminal device. The first security information is used by the second terminal device to decrypt information about the first clock that is obtained by the first terminal device through encryption.

Based on the foregoing technical solution, the clock management network element sends, to the second terminal device, the first security information used to decrypt the encrypted information about the first clock, so that the first terminal device can send the encrypted information about the first clock to the second terminal device. This can ensure secure transmission of the information about the first clock, to avoid a case in which another terminal device obtains the information about the first clock, and implement the timing information isolation.

With reference to the first aspect, in some embodiments of the first aspect, if the clock management network element obtains second security information, the first timing configuration information further includes the second security information. The second security information is used by the first terminal device to encrypt the information about the first clock. The method further includes: The clock management network element sends first security information to the second terminal device. The first security information is used by the second terminal device to decrypt information about the first clock that is obtained by the first terminal device through encryption.

Based on the foregoing technical solution, the clock management network element sends the first security information to the second terminal device, and sends the second security information to the first terminal device, so that the first terminal device can send the encrypted information about the first clock to the second terminal device. This can ensure the secure transmission of the information about the first clock, to avoid a case in which another terminal device obtains the information about the first clock, and implement the timing information isolation.

With reference to the first aspect, in some embodiments of the first aspect, the method further includes: The clock management network element determines that a second clock that meets second timing precision is further deployed on the first terminal device.

For example, the second timing precision is different from the first timing precision.

With reference to the first aspect, in some embodiments of the first aspect, the method further includes: The clock management network element sends an identifier of the first clock to the second terminal device.

Based on the foregoing technical solution, when a plurality of clocks with different timing precision are deployed on the first terminal device, the clock management network element sends the identifier of the first clock to the second terminal device, so that the second terminal device can request the information about the first clock from the first terminal device based on the identifier of the first clock.

With reference to the first aspect, in some embodiments of the first aspect, the first timing configuration information further includes the identifier of the first clock.

Based on the foregoing technical solution, when the plurality of clocks with different timing precision are deployed on the first terminal device, the clock management network element sends the identifier of the first clock to the first terminal device, so that the first terminal device can determine to send the information about the first clock to the second terminal device, instead of sending information about another clock, to implement the timing information isolation.

With reference to the first aspect, in some embodiments of the first aspect, the at least one terminal device further includes a third terminal device that requests the second timing precision, and the method further includes: The clock management network element sends second timing configuration information to the first terminal device. The second timing configuration information includes an identifier of the third terminal device and an identifier of the second clock.

Based on the foregoing technical solution, when determining that the second clock that meets the second timing precision is deployed on the first terminal device, the clock management network element sends the second timing configuration information to the first terminal device. The second timing configuration information includes an identifier of the third terminal device that requests the second timing precision. Therefore, the first terminal device can send information about the second clock in a second terminal device group based on the second timing configuration information. The second terminal device group includes the first terminal device and the third terminal device. It may be understood that the first terminal device sends the information about the second clock in the second terminal device group, and the second terminal device group includes the third terminal device that requests the second timing precision. Therefore, the first terminal device sends the information about the second clock to the third terminal device that requests the second timing precision, and does not send the information about the second clock to a terminal device that does not request the second timing precision, to implement the timing information isolation. The information about the second clock is used to perform timing for the third terminal device.

With reference to the first aspect, in some embodiments of the first aspect, the method further includes: The clock management network element receives clock capability information of the first terminal device from an access and mobility management function network element or a network repository function network element. The clock capability information includes the identifier of the first terminal device and at least one of the following: timing precision of the at least one clock, an identifier of the at least one clock, and at least one piece of security information used to decrypt encrypted information about the at least one clock.

Based on the foregoing technical solution, after receiving the clock capability information of the first terminal device, the clock management network element may determine, based on the clock capability information of the first terminal device, timing precision of a clock deployed on the first terminal device.

With reference to the first aspect, in some embodiments of the first aspect, the at least one terminal device further includes a fifth terminal device that requests third timing precision, and the method further includes: The clock management network element determines that a third clock deployed on a fourth terminal device meets the third timing precision. The clock management network element sends third timing configuration information to the fourth terminal device. The third timing configuration information includes an identifier of the fifth terminal device.

According to a second aspect, a timing method is provided. The method includes: A first terminal device receives first timing configuration information from a clock management network element. The first timing configuration information includes an identifier of a second terminal device. The first terminal device determines a first terminal device group based on the first timing configuration information. The first terminal device group includes the first terminal device and the second terminal device. The first terminal device sends information about a first clock in the first terminal device group. The first clock is a clock that is deployed on the first terminal device and that meets the first timing precision.

The information about the first clock is used to perform timing for a terminal device in the first terminal device group, and the information about the first clock may also be referred to as first timing information. Timing precision of the first clock is the same as the first timing precision, or timing precision of the first clock is higher than the first timing precision.

Based on the foregoing technical solution, the first terminal device may determine the first terminal device group based on the first timing configuration information, and send the information about the first clock in the first terminal device group. The first terminal device group includes the first terminal device and the second terminal device. It may be understood that, the first terminal device sends the information about the first clock in the first terminal device group, and the first terminal device group includes the second terminal device that requests the first timing precision. Therefore, the first terminal device sends the information about the first clock to the second terminal device that requests the first timing precision, and does not send the information about the first clock to a terminal device that does not request the first timing precision, to implement timing information isolation.

With reference to the second aspect, in some embodiments of the second aspect, the first timing configuration information indicates to send the information about the first clock in the first terminal device group.

Based on the foregoing technical solution, the first timing configuration information indicates to send the information about the first clock in the first terminal device group, so that the first terminal device can directly determine, based on the first timing configuration information, to send the information about the first clock in the first terminal device group, without increasing processing load of the first terminal device.

With reference to the second aspect, in some embodiments of the second aspect, that the first terminal device sends information about a first clock in the first terminal device group includes: The first terminal device receives a timing request message from the second terminal device. The timing request message includes the identifier of the second terminal device. The first terminal device determines, based on the identifier of the second terminal device, that the second terminal device belongs to the first terminal device group. The first terminal device sends the information about the first clock to the second terminal device.

Based on the foregoing technical solution, the first terminal device sends the information about the first clock to the second terminal device only when the first terminal device determines, based on the identifier of the second terminal device, that the first terminal device belongs to the first terminal device group, to implement the timing information isolation.

With reference to the second aspect, in some embodiments of the second aspect, that the first terminal device sends information about a first clock in the first terminal device group includes: The first terminal device sends the information about the first clock to a terminal device in the first terminal device group in a multicast manner.

Based on the foregoing technical solution, if the first terminal device group includes a plurality of terminal devices that request the first timing precision, the first terminal device sends the information about the first clock in the multicast manner, so that signaling can be reduced.

With reference to the second aspect, in some embodiments of the second aspect, the method further includes: The first terminal device encrypts the information about the first clock based on second security information. That the first terminal device sends information about a first clock in the first terminal device group includes: The first terminal device sends encrypted information about the first clock in the first terminal device group.

Based on the foregoing technical solution, the first terminal device encrypts the information about the first clock, so that secure transmission of the information about the first clock can be ensured. Because the first terminal device sends the encrypted information about the first clock, only a terminal device that obtains first security information can decrypt the encrypted information about the first clock, and a terminal device that does not obtain the first security information cannot correctly obtain the information about the first clock. Therefore, the timing information isolation can be implemented.

With reference to the second aspect, in some embodiments of the second aspect, the first timing configuration information further includes the second security information.

With reference to the second aspect, in some embodiments of the second aspect, when a second clock that meets second timing precision is further deployed on the first terminal device, the first timing configuration information further includes an identifier of the first clock.

For example, the second timing precision is different from the first timing precision.

Based on the foregoing technical solution, the first timing configuration information including the identifier of the first clock is sent to the first terminal device, so that the first terminal device can determine, based on the first timing configuration information, to send the information about the first clock to the second terminal device, instead of sending information about another clock, to implement the timing information isolation.

With reference to the second aspect, in some embodiments of the second aspect, when a second clock that meets second timing precision is further deployed on the first terminal device, that the first terminal device determines a first terminal device group based on the first timing configuration information includes: The first terminal device sends an identifier of the first terminal device and an identifier of the at least one clock to the second terminal device based on the first timing configuration information. The first terminal device receives the identifier of the second terminal device and an identifier of the first clock from the second terminal device. The first terminal device determines, based on the identifier of the second terminal device and the identifier of the first clock, that the first terminal device group includes the first terminal device and the second terminal device.

Based on the foregoing technical solution, if a plurality of clocks with different timing precision are deployed on the first terminal device, the first terminal device sends the identifier of the at least one clock to the second terminal device, and receives the identifier of the first clock fed back by the second terminal device, to determine that the second terminal device belongs to the first terminal device group rather than another terminal device group. Therefore, the first terminal device sends the information about the first clock in the first terminal device group, so that the first terminal device can send the information about the first clock to the second terminal device, instead of sending the information about another clock, to implement the timing information isolation.

With reference to the second aspect, in some embodiments of the second aspect, the method further includes: The first terminal device receives second timing configuration information from the clock management network element. The second timing configuration information includes an identifier of a third terminal device. The first terminal device determines a second terminal device group based on the second timing configuration information. The second terminal device group includes the first terminal device and the third terminal device. The first terminal device sends information about the second clock in the second terminal device group.

With reference to the second aspect, in some embodiments of the second aspect, the method further includes: The first terminal device sends clock capability information to an access and mobility management function network element. The clock capability information includes the identifier of the first terminal device and at least one of the following: timing precision of the at least one clock, the identifier of the at least one clock, and at least one piece of security information used to decrypt information about the at least one clock that is obtained by the first terminal device through encryption.

According to a third aspect, a timing method is provided. The method includes: A second terminal device sends a clock request message to a clock management network element. The clock request message includes an identifier of the second terminal device and first timing precision requested by the second terminal device. The second terminal device receives an identifier of a first terminal device from the clock management network element. A first clock deployed on the first terminal device meets the first timing precision. The second terminal device sends a timing request message to the first terminal device based on the identifier of the first terminal device. The second terminal device receives information about the first clock from the first terminal device.

The information about the first clock is used to perform timing for a terminal device in a first terminal device group, and the information about the first clock may also be referred to as first timing information. Timing precision of the first clock is the same as the first timing precision, or timing precision that meets the first clock is higher than the first timing precision.

Based on the foregoing technical solution, the second terminal device can request timing from the first terminal device based on the identifier of the first terminal device, instead of requesting timing from another terminal device. Therefore, the second terminal device can receive the information about the first clock only from the first terminal device, and cannot receive information about another clock, to implement timing information isolation.

With reference to the third aspect, in some embodiments of the third aspect, the second terminal device receives first security information from the clock management network element. That the second terminal device receives information about the first clock from the first terminal device includes: The second terminal device receives encrypted information about the first clock from the first terminal device. The method further includes: The second terminal device decrypts the encrypted information about the first clock based on the first security information.

Based on the foregoing technical solution, the clock management network element sends, to the second terminal device, the first security information used to decrypt the encrypted information about the first clock, so that the first terminal device can send the encrypted information about the first clock to the second terminal device. This can ensure secure transmission of the information about the first clock, to avoid a case in which another terminal device obtains the information about the first clock, and implement the timing information isolation.

With reference to the third aspect, in some embodiments of the third aspect, the timing request message further includes an identifier of the first clock, and the method further includes: The second terminal device receives the identifier of the first clock from the clock management network element.

Based on the foregoing technical solution, the second terminal device sends the identifier of the first clock to the first terminal device, so that the first terminal device can determine to send the information about the first clock to the second terminal device, instead of sending the information about the another clock, to implement the timing information isolation.

With reference to the third aspect, in some embodiments of the third aspect, the method further includes: The second terminal device receives the identifier of the first terminal device and an identifier of the at least one clock from the first terminal device. The second terminal device determines, based on the identifier of the at least one clock, that the at least one clock includes the first clock. The second terminal device sends the identifier of the second terminal device and the identifier of the first clock to the first terminal device.

Based on the foregoing technical solution, the second terminal device receives the identifier of the at least one clock sent by the first terminal device, and feeds back the identifier of the first clock to the first terminal device, so that the first terminal device can determine to send the information about the first clock to the second terminal device, instead of sending the information about the another clock, to implement the timing information isolation.

According to a fourth aspect, a timing method is provided. The method includes: A clock management network element receives a clock request message from a second terminal device. The clock request message includes first timing precision requested by the second terminal device. The clock management network element determines that a first clock deployed on a first terminal device meets the first timing precision. The clock management network element sends an identifier of the first terminal device to the second terminal device.

Based on the foregoing technical solution, when determining that the first clock that meets the first timing precision is deployed on the first terminal device, the clock management network element sends the identifier of the first terminal device to the second terminal device, so that the second terminal device can request timing from the first terminal device based on the identifier of the first terminal device, instead of requesting timing from another terminal device. Therefore, the second terminal device can obtain only information about the first clock, and cannot obtain information about another clock, to achieve timing information isolation.

With reference to the fourth aspect, in some embodiments of the fourth aspect, the method further includes: The clock management network element determines, based on subscription information of the second terminal device, that the second terminal device subscribes to a clock service of the first timing precision.

The subscription information of the second terminal device includes a clock service subscribed by the second terminal device.

Based on the foregoing technical solution, the clock management network element may determine, based on the subscription information of the second terminal device, that the second terminal device subscribes to the clock service of the first timing precision, to avoid providing the second terminal device with a clock service that is of high timing precision and that is not subscribed to by the second terminal device, and further implement the timing information isolation.

With reference to the fourth aspect, in some embodiments of the fourth aspect, the method further includes: The clock management network element obtains first security information. The first security information is obtained from the first terminal device. The clock management network element sends the first security information to the second terminal device. The first security information is used by the second terminal device to decrypt information about the first clock that is obtained by the first terminal device through encryption.

Based on the foregoing technical solution, the clock management network element sends, to the second terminal device, the first security information used to decrypt the encrypted information about the first clock, so that the first terminal device can send the encrypted information about the first clock to the second terminal device. This can ensure secure transmission of the information about the first clock, to avoid a case in which another terminal device obtains the information about the first clock, and implement the timing information isolation.

With reference to the fourth aspect, in some embodiments of the fourth aspect, the method further includes: The clock management network element determines that a second clock that meets second timing precision is further deployed on the first terminal device. The clock management network element sends the identifier of the first clock to the second terminal device.

For example, the second timing precision is different from the first timing precision.

Based on the foregoing technical solution, when a plurality of clocks with different timing precision are deployed on the first terminal device, the clock management network element sends the identifier of the first clock to the first terminal device, so that the first terminal device can determine to send the information about the first clock to the second terminal device, instead of sending information about another clock, to implement the timing information isolation.

According to a fifth aspect, a timing method is provided. The method includes: A first terminal device receives a timing request message from a second terminal device. The timing request message includes an identifier of the second terminal device and first timing precision requested by the second terminal device. The first terminal device sends information about a first clock to the second terminal device. The first clock is a clock that is deployed on the first terminal device and that meets the first timing precision.

Based on the foregoing technical solution, the second terminal device includes the requested first timing precision in the timing request message, so that the first terminal device can send the information about the first clock to the second terminal device based on the timing request message, to implement timing information isolation. For example, if the first clock deployed on the first terminal device does not meet the first timing precision, the first terminal device does not send the information about the first clock to the second terminal device. For another example, if a plurality of clocks are deployed on the first terminal device, for example, a second clock that meets second timing precision is further deployed, the first terminal device sends only the information about the first clock to the second terminal device, and does not send information about the second clock.

According to a sixth aspect, a timing method is provided. The method includes: A second terminal device sends a timing request message to a first terminal device. The timing request message includes an identifier of the second terminal device and first timing precision requested by the second terminal device. The second terminal device receives information about a first clock from the first terminal device. The first clock is a clock that is deployed on the first terminal device and that meets the first timing precision.

Based on the foregoing technical solution, the second terminal device includes the requested first timing precision in the timing request message, so that the first terminal device can send the information about the first clock to the second terminal device based on the timing request message, to implement timing information isolation. For example, if the first clock deployed on the first terminal device does not meet the first timing precision, the first terminal device does not send the information about the first clock to the second terminal device. For another example, if a plurality of clocks are deployed on the first terminal device, for example, a second clock that meets second timing precision is further deployed, the first terminal device sends only the information about the first clock to the second terminal device, and does not send information about the second clock.

According to a seventh aspect, a communication apparatus is provided, including a transceiver unit and a processing unit. The transceiver unit is configured to receive a clock request message from at least one terminal device. The clock request message includes an identifier of the terminal device and timing precision requested by the terminal device, and the at least one terminal device includes a second terminal device that requests first timing precision. The processing unit is configured to determine that a first clock deployed on a first terminal device meets the first timing precision. The transceiver unit is further configured to send first timing configuration information to the first terminal device. The first timing configuration information includes an identifier of the second terminal device.

With reference to the seventh aspect, in some embodiments of the seventh aspect, the processing unit is further configured to determine a first terminal device group based on the clock request message. The first terminal device group includes the first terminal device and a terminal device that requests the first timing precision in the at least one terminal device, and the terminal device that requests the first timing precision in the at least one terminal device includes the second terminal device. The first timing configuration information indicates to send information about the first clock in the first terminal device group, and the first timing configuration information includes an identifier of the terminal device that requests the first timing precision in the at least one terminal device.

With reference to the seventh aspect, in some embodiments of the seventh aspect, the processing unit is further configured to determine, based on subscription information of the second terminal device, that the second terminal device subscribes to a clock service of the first timing precision.

With reference to the seventh aspect, in some embodiments of the seventh aspect, the transceiver unit is further configured to send an identifier of the first terminal device to the second terminal device.

With reference to the seventh aspect, in some embodiments of the seventh aspect, the transceiver unit is further configured to obtain first security information. The first security information is obtained from the first terminal device. The transceiver unit is further configured to send the first security information to the second terminal device. The first security information is used by the second terminal device to decrypt information about the first clock that is obtained by the first terminal device through encryption.

With reference to the seventh aspect, in some embodiments of the seventh aspect, the first timing configuration information further includes second security information. The second security information is used by the first terminal device to encrypt the information about the first clock. The transceiver unit is further configured to send the first security information to the second terminal device. The first security information is used by the second terminal device to decrypt information about the first clock that is obtained by the first terminal device through encryption.

With reference to the seventh aspect, in some embodiments of the seventh aspect, the processing unit is further configured to determine that a clock that meets second timing precision is further deployed on the first terminal device.

With reference to the seventh aspect, in some embodiments of the seventh aspect, the transceiver unit is further configured to send an identifier of the first clock to the second terminal device.

With reference to the seventh aspect, in some embodiments of the seventh aspect, the first timing configuration information further includes the identifier of the first clock.

With reference to the seventh aspect, in some embodiments of the seventh aspect, the at least one terminal device further includes a third terminal device that requests the second timing precision. The transceiver unit is further configured to send second timing configuration information to the first terminal device. The second timing configuration information includes an identifier of the third terminal device and an identifier of the clock that meets the second timing precision.

With reference to the seventh aspect, in some embodiments of the seventh aspect, the transceiver unit is further configured to receive clock capability information of the first terminal device from an access and mobility management function network element or a network repository function network element. The clock capability information includes the identifier of the first terminal device and at least one of the following: timing precision of the at least one clock, an identifier of the at least one clock, and at least one piece of security information used to decrypt information about the at least one clock that is obtained by the first terminal device through encryption.

With reference to the seventh aspect, in some embodiments of the seventh aspect, the at least one terminal device further includes a fifth terminal device that requests third timing precision. The processing unit is further configured to determine that a third clock deployed on a fourth terminal device meets the third timing precision. The transceiver unit is further configured to send third timing configuration information to the fourth terminal device. The third timing configuration information includes an identifier of the fifth terminal device.

According to an eighth aspect, a communication apparatus is provided, including a transceiver unit and a processing unit. The transceiver unit is configured to receive first timing configuration information from a clock management network element. The first timing configuration information includes an identifier of a second terminal device. The processing unit is configured to determine a first terminal device group based on the first timing configuration information. The first terminal device group includes a first terminal device and the second terminal device. The transceiver unit is further configured to send information about a first clock in the first terminal device group. The first clock is a clock that is deployed on the first terminal device and that meets the first timing precision.

With reference to the eighth aspect, in some embodiments of the eighth aspect, the first timing configuration information indicates to send the information about the first clock in the first terminal device group.

With reference to the eighth aspect, in some embodiments of the eighth aspect, the transceiver unit is further configured to receive a timing request message from the second terminal device. The timing request message includes the identifier of the second terminal device. The processing unit is further configured to determine, based on the identifier of the second terminal device, that the second terminal device belongs to the first terminal device group. The transceiver unit is further configured to send the information about the first clock to the second terminal device.

With reference to the eighth aspect, in some embodiments of the eighth aspect, the transceiver unit is further configured to send the information about the first clock to a terminal device in the first terminal device group in a multicast manner.

With reference to the eighth aspect, in some embodiments of the eighth aspect, the processing unit is further configured to encrypt the information about the first clock based on second security information. The transceiver unit is further configured to send encrypted information about the first clock in the first terminal device group.

With reference to the eighth aspect, in some embodiments of the eighth aspect, the first timing configuration information further includes the second security information.

With reference to the eighth aspect, in some embodiments of the eighth aspect, when a second clock that meets second timing precision is further deployed on the first terminal device, the first timing configuration information further includes an identifier of the first clock.

With reference to the eighth aspect, in some embodiments of the eighth aspect, when a second clock that meets second timing precision is further deployed on the first terminal device, the processing unit is further configured to send an identifier of the first terminal device and an identifier of the at least one clock to the second terminal device based on the first timing configuration information. The transceiver unit is further configured to receive the identifier of the second terminal device and an identifier of the first clock from the second terminal device. The processing unit is further configured to determine, based on the identifier of the second terminal device and the identifier of the first clock, that the first terminal device group includes the first terminal device and the second terminal device.

With reference to the eighth aspect, in some embodiments of the eighth aspect, the transceiver unit is further configured to receive second timing configuration information from the clock management network element. The second timing configuration information includes an identifier of a third terminal device. The processing unit is further configured to determine a second terminal device group based on the second timing configuration information. The second terminal device group includes the first terminal device and the third terminal device. The transceiver unit is further configured to send information about the second clock in the second terminal device group.

With reference to the eighth aspect, in some embodiments of the eighth aspect, the transceiver unit is further configured to send clock capability information to an access and mobility management function network element. The clock capability information includes the identifier of the first terminal device and at least one of the following: timing precision of the at least one clock, an identifier of the at least one clock, and at least one piece of security information used to decrypt information about the at least one clock that is obtained by the first terminal device through encryption.

According to a ninth aspect, a communication apparatus is provided, including a transceiver unit. The transceiver unit is configured to send a clock request message to a clock management network element. The clock request message includes an identifier of a second terminal device and first timing precision requested by the second terminal device. The transceiver unit is further configured to receive an identifier of a first terminal device from the clock management network element, and a first clock deployed on the first terminal device meets the first timing precision. The transceiver unit is further configured to send a timing request message to the first terminal device based on the identifier of the first terminal device. The transceiver unit is further configured to receive information about the first clock from the first terminal device.

With reference to the ninth aspect, in some embodiments of the ninth aspect, the transceiver unit is further configured to receive first security information from the clock management network element. The transceiver unit is further configured to receive encrypted information about the first clock from the first terminal device. The communication apparatus further includes a processing unit. The processing unit is configured to decrypt the encrypted information about the first clock based on the first security information.

With reference to the ninth aspect, in some embodiments of the ninth aspect, the timing request message further includes an identifier of the first clock, and the transceiver unit is further configured to receive the identifier of the first clock from the clock management network element.

With reference to the ninth aspect, in some embodiments of the ninth aspect, the communication apparatus further includes a processing unit. The transceiver unit is further configured to receive the identifier of the first terminal device and an identifier of the at least one clock from the first terminal device. The processing unit is configured to determine, based on the identifier of the at least one clock, that the at least one clock includes the first clock. The transceiver unit is further configured to send the identifier of the second terminal device and the identifier of the first clock to the first terminal device.

According to a tenth aspect, a communication apparatus is provided, including a transceiver unit and a processing unit. The transceiver unit is configured to receive a clock request message from a second terminal device. The clock request message includes first timing precision requested by the second terminal device. The processing unit is configured to determine that a first clock deployed on a first terminal device meets the first timing precision. The transceiver unit is further configured to send an identifier of the first terminal device to the second terminal device.

With reference to the tenth aspect, in some embodiments of the tenth aspect, the processing unit is further configured to determine, based on subscription information of the second terminal device, that the second terminal device subscribes to a clock service of the first timing precision.

With reference to the tenth aspect, in some embodiments of the tenth aspect, the transceiver unit is further configured to obtain first security information. The first security information is obtained from the first terminal device. The transceiver unit is further configured to send the first security information to the second terminal device. The first security information is used by the second terminal device to decrypt information about the first clock that is obtained by the first terminal device through encryption.

With reference to the tenth aspect, in some embodiments of the tenth aspect, the processing unit is further configured to determine that a second clock that meets second timing precision is further deployed on the first terminal device. The transceiver unit is further configured to send an identifier of the first clock to the second terminal device.

According to an eleventh aspect, a communication apparatus is provided, including a transceiver unit. The transceiver unit is configured to receive a timing request message from a second terminal device. The timing request message includes an identifier of the second terminal device and first timing precision requested by the second terminal device. The transceiver unit is further configured to send information about a first clock to the second terminal device. The first clock is a clock that is deployed on the first terminal device and that meets the first timing precision.

According to a twelfth aspect, a communication apparatus is provided, including a transceiver unit. The transceiver unit is configured to send a timing request message to a first terminal device. The timing request message includes an identifier of the second terminal device and first timing precision requested by the second terminal device. The transceiver unit is further configured to receive information about a first clock from the first terminal device. The first clock is a clock that is deployed on the first terminal device and that meets the first timing precision.

According to a thirteenth aspect, a communication apparatus is provided, including a processor. The processor is coupled to a memory, and may be configured to execute instructions in the memory, to perform the method according to any one of the first aspect and the some embodiments of the first aspect, or perform the method according to any one of the fourth aspect and the some embodiments of the fourth aspect. In some cases, the communication apparatus further includes the memory. In some cases, the communication apparatus further includes a communication interface, and the processor is coupled to the communication interface.

In some embodiments, the communication apparatus is a clock management network element. When the communication apparatus is the clock management network element, the communication interface may be a transceiver or an input/output interface.

In some embodiments, the communication apparatus is a chip disposed in the clock management network element. When the communication apparatus is the chip disposed in the clock management network element, the communication interface may be the input/output interface.

In some cases, the transceiver may be a transceiver circuit. In some cases, the input/output interface may be an input/output circuit.

According to a fourteenth aspect, a communication apparatus is provided, including a processor. The processor is coupled to a memory; and may be configured to execute instructions in the memory, to perform the method according to any one of the second aspect and the some embodiments of the second aspect, or perform the method according to any one of the fifth aspect and the some embodiments of the fifth aspect. In some cases, the communication apparatus further includes the memory. In some cases, the communication apparatus further includes a communication interface, and the processor is coupled to the communication interface.

In some embodiments, the communication apparatus is a first terminal device. When the communication apparatus is the first terminal device, the communication interface may be a transceiver or an input/output interface.

In some embodiments, the communication apparatus is a chip disposed in the first terminal device. When the communication apparatus is the chip disposed in the first terminal device, the communication interface may be the input/output interface.

In some cases, the transceiver may be a transceiver circuit. In some cases, the input/output interface may be an input/output circuit.

According to a fifteenth aspect, a communication apparatus is provided, including a processor. The processor is coupled to a memory, and may be configured to execute instructions in the memory, to perform the method according to any one of the third aspect and the some embodiments of the third aspect, or perform the method according to any one of the sixth aspect and the some embodiments of the sixth aspect. In some cases, the communication apparatus further includes the memory. In some cases, the communication apparatus further includes a communication interface, and the processor is coupled to the communication interface.

In some embodiments, the communication apparatus is a second terminal device. When the communication apparatus is the second terminal device, the communication interface may be a transceiver or an input/output interface.

In some embodiments, the communication apparatus is a chip disposed in the second terminal device. When the communication apparatus is the chip disposed in the second terminal device, the communication interface may be the input/output interface.

In some cases, the transceiver may be a transceiver circuit. In some cases, the input/output interface may be an input/output circuit.

According to a sixteenth aspect, a processor is provided, including an input circuit, an output circuit, and a processing circuit. The processing circuit is configured to receive a signal through the input circuit, and transmit a signal through the output circuit, to enable the processor to perform the method according to any one of the some embodiments of the first aspect to the sixth aspect.

In an example process, the processor may be one or more chips, the input circuit may be an input pin, the output circuit may be an output pin, and the processing circuit may be a transistor, a gate circuit, a trigger, various logic circuits, and the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a seventeenth aspect, a processing apparatus is provided, including a processor and a memory. The processor is configured to read instructions stored in the memory, receive a signal by using a receiver, and transmit a signal by using a transmitter, to perform the method according to any one of the some embodiments of the first aspect to the sixth aspect.

In some cases, there are one or more processors, and there are one or more memories.

In some cases, the memory may be integrated with the processor, or the memory and the processor are separately disposed.

In an example process, the memory may be a non-transitory memory, such as a read-only memory (ROM). The memory and the processor may be integrated into one chip, or may be separately disposed in different chips. A type of the memory and a manner in which the memory and the processor are disposed are not limited in embodiments of this application.

It should be understood that, a related data exchange process such as sending of indication information may be a process of outputting the indication information from the processor, and receiving of capability information may be a process of receiving the input capability information by the processor. For example, data output by the processor may be output to the transmitter, and input data received by the processor may be from the receiver. The transmitter and the receiver may be collectively referred to as a transceiver.

The processing apparatus in the seventeenth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to an eighteenth aspect, a computer program product is provided. The computer program product includes a computer program (which may also be referred to as code or instructions). When the computer program is run, a computer is enabled to perform the method according to any one of the some embodiments of the first aspect to the sixth aspect.

According to a nineteenth aspect, a computer-readable storage medium is provided. The computer-readable storage medium stores a computer program (which may also be referred to as code or instructions). When the computer program is run on a computer, the method according to any one of the some embodiments of the first aspect to the sixth aspect is performed.

According to a twentieth aspect, a communication system is provided, including the foregoing clock management network element.

In some cases, the system further includes a first terminal device and/or a second terminal device.

In some cases, the system further includes an access and mobility management function network element and/or a network repository function network element.

DESCRIPTION OF EMBODIMENTS

Figure 1:
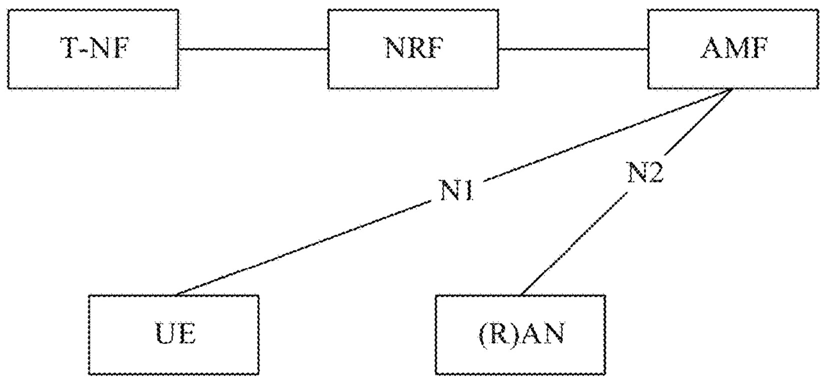
FIG. 1 is a diagram of a system applicable to a method provided in an embodiment of this application according to an embodiment of this application.

The following describes technical solutions in embodiments of this application with reference to accompanying drawings.

The technical solutions in embodiments of this application may be applied to various communication systems, for example, a long term evolution (LTE) system, a frequency division duplex (FDD) system, a time division duplex (TDD) system, a universal mobile telecommunications system (UMTS), a worldwide interoperability for microwave access (WiMAX) communication system, a 5th generation (5G) system, a new radio (NR) system, a 6th generation (6G) system, or a future communication system. The 5G mobile communication system in this application includes a non-standalone (NSA) 5G mobile communication system or a standalone (SA) 5G mobile communication system. The communication system may alternatively be a public land mobile network (PLMN), a device-to-device (D2D) communication system, a machine-to-machine (M2M) communication system, an internet of things (IoT) communication system, a vehicle to everything (V2X) communication system, an uncrewed aerial vehicle (UAV) communication system, or another communication system.

The following describes the technical solutions in embodiments of this application with reference to the accompanying drawings in embodiments of this application. In the descriptions of this application, unless otherwise specified, "/" indicates that associated objects are in an "or" relationship. For example, A/B may represent A or B. In this application, "and/or" describes only an association relationship between associated objects and represents that three relationships may exist. For example, A and/or B may indicate: Only A exists, both A and B exist, and only B exists, where A and B may be singular or plural. In addition, in the descriptions of this application, "a plurality of" means two or more than two unless otherwise specified. "At least one of the following items (or pieces)" or a similar expression thereof refers to any combination of these items, including any combination of singular items or plural items. For example, at least one piece of a, b, or c may represent: a, b, c, a–b, a–c, b–c, or a–b–c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art understands that the terms such as "first" and "second" do not limit a quantity and an execution sequence, and the terms such as "first" and "second" do not indicate a definite difference. In addition, in embodiments of this application, words such as "example" or "for example" are used to represent an example or a description. Any embodiment or technical solution described as an "example" or "for example" in embodiments of this application should not be explained as being more preferred or having more advantages than another embodiment or technical solution. Exactly, use of the word such as "example" or "for example" is intended to present a relative concept in an example manner for ease of understanding.

In addition, a network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

For ease of understanding of embodiments of this application, an application scenario of embodiments of this application is first described in detail with reference to FIG. 1.

1. A user equipment (UE) may be referred to as a terminal device, and is a device that provides voice/data connectivity for a user, for example, a handheld device or a vehicle-mounted device having a wireless connection function. Currently, some examples of the terminal may be: a mobile phone, a tablet computer (or a pad), a computer (for example, a notebook computer or a palmtop computer) having a wireless transceiver function, a mobile internet device (MID), a virtual reality (VR) device, an augmented reality (AR) device, a wireless terminal in industrial control, a wireless terminal in self-driving, a wireless terminal in remote medical, a wireless terminal in smart grid, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, and a terminal device in a future evolved PLMN.

The wearable device may also be referred to as a wearable intelligent device, and is a general term of wearable devices, such as glasses, gloves, watches, clothes, and shoes, that are intelligently designed and developed for daily wear by applying wearable technologies. The wearable device is a portable device that can be directly worn on a body or integrated into clothes or an accessory of a user. The wearable device is not merely a hardware device, but is used to implement a powerful function through software support, data exchange, and cloud interaction. In a broad sense, intelligent wearable devices include full-featured and large-size devices that can implement complete or partial functions without depending on smartphones, for example, smart watches or smart glasses, and devices that dedicated to only one type of application and need to be used together with other devices such as smartphones, such as various smart bands or smart jewelry used for monitoring physical signs.

In addition, the terminal device may alternatively be a terminal device in an internet of things (IoT) system. The IoT is an important part of future information technology development. A main technical feature of the IoT is to connect things to a network by using a communication technology, to implement a smart network for human-machine interconnection and thing-thing interconnection. In an IoT technology, massive connections, deep coverage, and power saving of a terminal may be implemented by using, for example, a narrow band (NB) technology.

2. An access network (AN) is used to provide a network access function for an authorized user in an example area, and can use transmission tunnels with different quality based on user levels, service requirements, and the like. The access network may be an access network using different access technologies. Conventional access network technologies include: a radio access network technology used in a 3rd generation (3G) system, a radio access network technology used in a 4th generation (4G) system, or a next generation radio access network (NG-RAN) technology (for example, a radio access technology used in a 5G system).

An access network that implements an access network function based on a wireless communication technology may be referred to as a radio access network (RAN). The radio access network can manage radio resources, provide an access service for a terminal, and further complete forwarding of a control signal and user data between the terminal and a core network.

A radio access network device may be, for example, a base station (NodeB), an evolved NodeB (evolved NodeB, eNB or eNodeB), a next generation Node base station (gNB) in a 5G mobile communication system, a base station in a future mobile communication system, or an access point (AP) in a Wi-Fi wireless hotspot system, or may be a radio controller in a cloud radio access network (CRAN) scenario. Alternatively, the radio access network device may be a relay station, an access point, a vehicle-mounted device, an uncrewed aerial vehicle, a wearable device, a network device in a 5G network, a network device in an evolved PLMN, or the like. An example technology used by the radio access network device and an example device form are not limited in embodiments of this application.

3. An access management network element is mainly used for mobility management and access management, is responsible for transferring a user policy between the user equipment and a policy control function (PCF) network element, and may be configured to implement a function other than session management in a mobility management entity (MME) function, for example, an access authorization function.

In a 5G communication system, the access management network element may be an access and mobility management (AMF) network element. In a future communication system, the access management network element may still be the AMF network element, or may have another name. This is not limited in this application.

4. A network repository function (NRF) network element may be configured to: provide a network element sending function and provide, based on a request of another network element, network element information corresponding to a network element type. The NRF network element further provides network element management services, for example, network element registration, update, and deregistration, and network element status subscription and push.

In embodiments of this application, the NRF may be further configured to: receive clock capability information of a terminal device, and provide the clock capability information of the terminal device for a clock management network element. For more descriptions of functions of the NRF and the clock capability information, refer to the following descriptions in the method 200 to the method 600.

5. The clock management network element may be configured to: receive clock capability information of a first terminal device, and receive a clock request message of a second terminal device. Further, when a clock deployed on the first terminal device meets timing precision requested by the second terminal device, the first terminal device and the second terminal device are determined as a terminal device group, and the first terminal device is indicated to perform timing in the terminal device group. For example, the clock management network element shown in FIG. 1 is a timing network function (T-NF) network element. For more descriptions of functions of the clock management network element, refer to the following descriptions in the method 200 to the method 600.

For example, the T-NF may be a time sensitive communication and time synchronization function (TSCTSF) network element defined based on a 3rd generation partnership project (3GPP). For a definition and a function of the TSCTSF network element, refer to a definition in 3GPP release 17 (R17). It should be understood that when the T-NF provided in this embodiment of this application is implemented based on the TSCTSF network element, the TSCTSF may further have all or some functions of the T-NF provided in this embodiment of this application.

In some cases, the communication system shown in FIG. 1 may further include one or more of the following network elements (not shown in the figure): a session management function (SMF) network element, a user plane function (UPF) network element, a data network (DN) network element, a PCF network element, a unified data management (UDM) network element, a network exposure function (NEF) network element, an application function (application function, AF) network element, and a network data analysis function (network data analysis function, NWDAF) network element.

In a wireless communication system. UEs may directly communicate with each other without using a network device, and an interface for the direct communication between the UEs is referred to as a PC5 interface. The PC5 interface may alternatively be used for D2D communication and V2X communication. For example, in the V2X communication, each vehicle is one UE. Because data transmission may be directly performed between the UEs without using a network, a communication delay can be effectively reduced.

If at least one clock is deployed on one UE of two UEs that can directly communicate with each other, and the other UE has a timing requirement, after receiving a timing request from the UE having the timing requirement, the UE deployed with the clock may perform timing for the UE having the timing requirement. However, as long as the UE deployed with the clock receives the timing request from the UE having the timing requirement, the UE deployed with the clock performs timing for the UE having the timing requirement, and timing information isolation cannot be performed.

In view of this, this embodiment of this application provide a timing method, to optimize a timing manner, to implement the timing information isolation.

Figure 2:
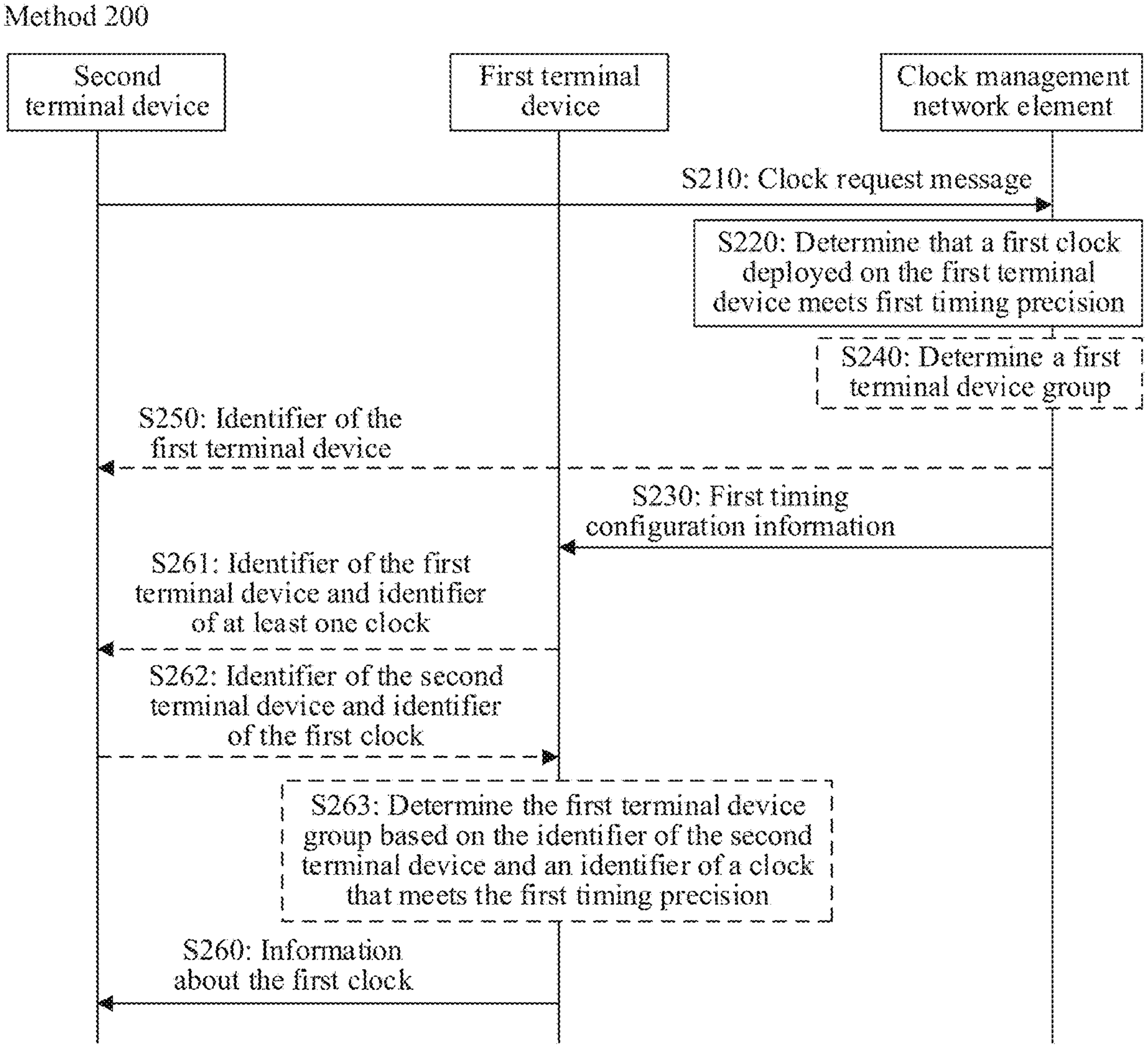
FIG. 2 is a schematic flowchart of a method according to an embodiment of this application.

FIG. 2 is a schematic flowchart of a timing method according to an embodiment of this application. The following describes in detail operations included in the method 200.

S210: A clock management network element receives a clock request message from at least one terminal device.

The clock request message includes an identifier of the terminal device and timing precision requested by the terminal device. A clock request message (denoted as a clock request message #1 below) received by the clock management network element from a second terminal device is used as an example, and the clock request message #1 includes an identifier of the second terminal device and first timing precision requested by the second terminal device. The timing precision requested by the terminal device may alternatively be understood as precision or a unit of information about a clock requested by the terminal device. For example, the timing precision requested by the terminal device may be 10 milliseconds (ms). 1 ms, one microsecond (μs), or one nanosecond (ns). The identifier of the terminal device may be any identifier that can identify the terminal device. For example, the identifier of the terminal device may be one or more of the following: an international mobile subscriber identity (IMSI), an international mobile equipment identity (IMEI), a subscription permanent identifier (SUPI), a generic public subscription identifier (GPSI), and an internet protocol (IP) quintuplet.

For example, the at least one terminal device includes the second terminal device that requests the first timing precision. In other words, in S210, the clock management network element receives the clock request message #1 from the second terminal device.

In some cases, the at least one terminal device further includes a third terminal device that requests second timing precision, and the second timing precision is different from the first timing precision. In other words, in S210, the clock management network element receives a clock request message (denoted as a clock request message #2 below) from the third terminal device. The clock request message #2 includes the second timing precision and an identifier of the third terminal device.

In some cases, the at least one terminal device further includes a fifth terminal device that requests third timing precision, and the third timing precision is different from the first timing precision and the second timing precision. In other words, in S210, the clock management network element receives a clock request message (denoted as a clock request message #3 below) from the fifth terminal device. The clock request message #3 includes the third timing precision and an identifier of the fifth terminal device.

S220: The clock management network element determines that a first clock deployed on the first terminal device meets the first timing precision.

For example, the clock management network element determines, based on clock capability information of the first terminal device, that the first clock deployed on the first terminal device meets the first timing precision. The clock capability information of the first terminal device includes an identifier of the first terminal device and at least one of the following: timing precision of at least one clock deployed on the first terminal device, an identifier of the at least one clock, and at least one piece of security information used to decrypt information about the at least one clock that is obtained by the first terminal device through encryption.

The identifier of the clock may be any identifier that can identify the clock. For example, the identifier of the clock may be one or more of the following: timing precision of the clock, a time domain number of the clock. It should be noted that, in the at least one clock deployed on the first terminal device, different clocks have different identifiers. The at least one piece of security information is in one-to-one correspondence with information about the at least one clock, and different security information corresponds to information about the different clocks. First security information in the at least one piece of security information is used as an example. The first security information is used to decrypt information about the first clock that is obtained by the first terminal device through encryption. In other words, the information about the first clock corresponds to the first security information.

Table 1 shows an example of the clock capability information of the first terminal device by using an example in which three clocks are deployed on the first terminal device.

TABLE 1

| | Timing precision of a clock | Identifier of the clock | Security information |
|---|---|---|---|
| Identifier of the first terminal device | Timing precision of a clock #1 | Identifier of the clock #1 | Security information #1 used to decrypt information about the clock #1 that is obtained by the first terminal device through encryption |
| | Timing precision of a clock #2 | Identifier of the clock #2 | Security information #2 used to decrypt information about the clock #2 that is obtained by the first terminal device through encryption |
| | Timing precision of a clock #3 | Identifier of the clock #3 | Security information #3 used to decrypt information about the clock #3 that is obtained by the first terminal device through encryption |

For example, if timing precision of the first clock deployed on the first terminal device is the same as the first timing precision, or if timing precision of the first clock deployed on the first terminal device is higher than the first timing precision, the clock management network element determines that the first clock deployed on the first terminal device meets the first timing precision. In other words, the timing precision of the first clock may be the same as the first timing precision, and the timing precision of the first clock may alternatively be higher than the first timing precision.

In some cases, if the timing precision of the at least one clock deployed on the first terminal device includes the second timing precision, and/or the identifier of the at least one clock includes an identifier of a clock that meets the second timing precision, the clock management network element may further determine that a second clock that meets the second timing precision is deployed on the first terminal device. Similarly, timing precision that meets the second clock may be the same as the second timing precision, and the timing precision of the second clock may alternatively be higher than the second timing precision.

In some cases, if the clock management network element does not obtain the clock capability information of the first terminal device, before S220, the method 200 further includes: The clock management network element receives the clock capability information of the first terminal device from an access and mobility management function network element or a network repository function network element. Accordingly, the access and mobility management function network element or the network repository function network element sends the clock capability information of the first terminal device to the clock management network element. When receiving the clock capability information of the first terminal device, the access and mobility management function network element or the network repository function network element may send the clock capability information of the first terminal device to the clock management network element. Alternatively, the access and mobility management function network element or the network repository function network element sends the clock capability information of the first terminal device to the clock management network element in response to a request of the clock management network element. For example, the clock management network element may send a subscription request message to the network repository function network element. The subscription request message is used to request to subscribe to clock capability information of the terminal device. Accordingly, after receiving the clock capability information of the first terminal device, the network repository function network element sends the clock capability information of the first terminal device to the clock management network element in response to the subscription request message.

The access and mobility management network element may receive the clock capability information of the first terminal device from the first terminal device via an access network device. For example, the first terminal device sends a next generation (NG) setup request message to the access network device. The NG setup request message includes the clock capability information of the first terminal device. Then, the access network device sends a UE clock capability registration request message to the access and mobility management function network element. The UE clock capability registration request message includes the capability information of the first terminal device. The network repository function network element may receive the capability information of the first terminal device from the access and mobility management network element. For example, the access and mobility management network element sends the UE clock capability registration request message to the network repository function network element. The UE clock capability registration request message includes the clock capability information of the first terminal device.

In some cases, before S220, the method 200 further includes: The clock management network element determines, based on subscription information of the second terminal device, whether the second terminal device subscribes to a clock service of the first timing precision. The subscription information of the second terminal device includes a clock service subscribed by the second terminal device. It may be understood that if the second terminal device subscribes to a clock service whose timing precision is higher than the first timing precision, the clock management network element may also consider that the second terminal device subscribes to the clock service of the first timing precision. For example, the first timing precision is 10 ns. If the second terminal device subscribes to a clock service of 1 ns, the clock management network element may consider that the second terminal device subscribes to a clock service of 10 ns.

In some cases, when the first timing precision is greater than or equal to a preset threshold, the clock management network element determines, based on the subscription information of the second terminal device, whether the second terminal device subscribes to the clock service of the first timing precision. When the first timing precision is less than the preset threshold, the clock management network element may consider by default that the second terminal device subscribes to the clock service of the first timing precision. The preset threshold may be one second(s), 100 ms, or the like. This is not limited in this embodiment of this application.

Further, if the clock management network element determines that the second terminal device subscribes to the clock service of the first timing precision, the clock management network element may determine to allow to provide, for the second terminal device, information about a clock that meets the first timing precision, and the clock management network element continues to perform S220. If the clock management network element determines that the second terminal device does not subscribe to the clock service of the first timing precision, the clock management network element may determine not to allow to provide, for the second terminal device, the information about the clock that meets the first timing precision, and the clock management network element does not perform S220. It should be understood that, when the clock management network element determines not to allow to provide, for the second terminal device, the information about the clock that meets the first timing precision, the clock management network element does not perform S220, to avoid providing the second terminal device with a clock service that is of high timing precision and that is not subscribed to by the second terminal device.

In some cases, if the clock management network element determines, in S220, that the timing precision (for example, denoted as timing precision #A) of the first clock deployed on the first terminal device is higher than the first timing precision, the method 200 further includes: The clock management network element determines, based on the subscription information of the second terminal device, whether the second terminal device subscribes to a clock service of the timing precision #A. If the second terminal device subscribes to the clock service of the timing precision #A. S230 in the method 200 continues to be performed. If the second terminal device does not subscribe to the clock service of the timing precision #A. S230 in the method 200 is not performed.

In some cases, if the clock management network element receives the clock request message #2 in S210, the clock management network element may further determine, in S220, that the second clock deployed on the first terminal device meets the second timing precision. In some cases, if the clock management network element determines, based on subscription information of the third terminal device, that the third terminal device subscribes to a clock service of the second timing precision, the clock management network element then determines whether the second clock is deployed on the first terminal device.

In some cases, if the clock management network element receives the clock request message #3 in S210, the clock management network element may further determine, in S220, that a third clock deployed on a fourth terminal device meets the third timing precision. In some cases, if the clock management network element determines, based on subscription information of the fifth terminal device, that the fifth terminal device subscribes to a clock service of the third timing precision, the clock management network element then determines whether the third clock is deployed on the fourth terminal device.

S230: The clock management network element sends first timing configuration information to the first terminal device. Accordingly, the first terminal device receives the first timing configuration information from the clock management network element.

The first timing configuration information indicates, to the first terminal device, a terminal device that requests timing. The first timing configuration information includes the identifier of the second terminal device.

In some cases, if the clock management network element determines, based on at least one clock request message, that a sixth terminal device also requests the first timing precision, the first timing configuration information may further include an identifier of the sixth terminal device. In some cases, the first timing configuration information includes identifiers of all terminal devices that request the first timing precision in the at least one terminal device.

In some cases, if the clock management network element determines, based on the clock capability information of the first terminal device, that a plurality of clocks with different timing precision are deployed on the first terminal device, for example, the clock management network element determines, based on the clock capability information of the first terminal device, that the second clock is deployed on the first terminal device, the first timing configuration information may further include an identifier of the first clock. It should be understood that if the first timing configuration information includes the identifier of the first clock, the first terminal device is enabled to send the information about the first clock in a first terminal device group based on the identifier of the first clock, instead of sending information about another clock.

In some cases, the first timing configuration information may further include second security information. The second security information is used by the first terminal device to encrypt the information about the first clock. In some cases, the second security information is allocated by the clock management network element. It should be understood that if the first timing configuration information includes the second security information, the first terminal device is enabled to encrypt the information about the first clock based on the second security information, to ensure secure transmission of the information about the first clock.

In some cases, before S230, the method 200 further includes S240: The clock management network element determines the first terminal device group. The first terminal device group includes the first terminal device and the terminal device that requests the first timing precision in the at least one terminal device, and the terminal device that requests the first timing precision in the at least one terminal device includes the second terminal device. In other words, in S240, the clock management network element determines, based on the at least one clock request message and the clock capability information of the first terminal device, the terminal device that requests the first timing precision in the at least one terminal device and the first terminal device on which the first clock is deployed as the first terminal device group.

It should be noted that, that the clock management network element determines the first terminal device group means that the clock management network element groups the at least one terminal device and the first terminal device, to group the first terminal device and the terminal device that requests the first timing precision in the at least one terminal device into a same terminal device group (that is, the first terminal device group). Alternatively, that the clock management network element determines the first terminal device group means that the clock management network element determines group members included in the first terminal device group, in other words, the clock management network element determines that the first terminal device group includes the first terminal device and the terminal device that requests the first timing precision in the at least one terminal device. Alternatively, that the clock management network element determines the first terminal device group means that the clock management network element determines identifiers of group members included in the first terminal device group, in other words, the clock management network element determines the identifier of the first terminal device that is included in the first terminal device group and an identifier of the terminal device that requests the first timing precision in the at least one terminal device and that is included in the first terminal device group.

Further, in S230, the first timing configuration information sent by the clock management network element to the first terminal device may include the identifier of the terminal device that requests the first timing precision in the at least one terminal device, and the first timing configuration information further indicates to send the information about the first clock in the first terminal device group.

In some cases, after determining the first terminal device group, the clock management network element may further allocate a group identifier to the first terminal device group, include the group identifier of the first terminal device group in the first timing configuration information, and send the first timing configuration information to the first terminal device. The group identifier of the first terminal device group may be determined based on an identifier of a terminal device included in the first terminal device group.

In some cases, if the clock management network element receives the clock request message #2, and determines that the second clock is deployed on the first terminal device, the method 200 further includes: The clock management network element sends second timing configuration information to the first terminal device. The second timing configuration information includes the identifier of the third terminal device. In some cases, the second timing configuration information further includes an identifier of the second clock. In some cases, the second timing configuration information further includes third security information. The third security information is used by the first terminal device to encrypt information about the second clock. In some cases, if the clock management network element determines, based on the at least one clock request message and the clock capability information of the first terminal device, a terminal device that requests the second timing precision in the at least one terminal device and the first terminal device on which the second clock is deployed as a second terminal device group, the second timing configuration information may include an identifier of the terminal device that requests the second timing precision in the at least one terminal device, and the second timing configuration information further indicates to send the information about the second clock in the second terminal device group. In some cases, the second timing configuration information may further include a group identifier of the second terminal device group.

It should be noted that the clock management network element may include the first timing configuration information and the second timing configuration information in a same message and send the message to the first terminal device, or may include the first timing configuration information and the second timing configuration information in different messages and send the messages to the first terminal device. This is not limited in this embodiment of this application.

In some cases, if the clock management network element receives the clock request message #3, and determines that the third clock is deployed on the fourth terminal device, the method 200 further includes: The clock management network element sends third timing configuration information to the fourth terminal device. The third timing configuration information includes the identifier of the fifth terminal device. For more descriptions of the third timing configuration information, refer to the descriptions of the first timing configuration information and the second timing configuration information.

In some cases, the method 200 further includes S250: The clock management network element sends the identifier of the first terminal device to the second terminal device. Accordingly, in S250, the second terminal device receives the identifier of the first terminal device from the clock management network element.

After receiving the identifier of the first terminal device from the clock management network element, the second terminal device may determine that the first clock is deployed on the first terminal device. Therefore, the second terminal device requests timing from the first terminal device based on the identifier of the first terminal device, instead of requesting timing from another terminal device, to avoid a case in which the second terminal device obtains information about a clock that is not needed by the second terminal device.

In some cases, if the plurality of clocks with different timing precision are deployed on the first terminal device, in S250, the clock management network element further sends the identifier of the first clock to the second terminal device. Therefore, the second terminal device requests the information about the first clock from the first terminal device based on the identifier of the first clock, to avoid a case in which the first terminal device sends information about another clock to the second terminal device, for example, avoid a case in which the first terminal device sends the information about the second clock to the second terminal device.

In some cases, in S250, the clock management network element further sends the first security information to the second terminal device. The first security information is used to decrypt the information about the first clock that is obtained by the first terminal device through encryption. For example, if the clock capability information of the first terminal device includes the at least one piece of security information, the clock management network element determines the first security information from the at least one piece of security information, and sends the first security information to the second terminal device. For example, the first security information is allocated by the clock management network element. It should be understood that the clock management network element sends the first security information to the second terminal device. In this case, the first terminal device may send the encrypted information about the first clock to the second terminal device, to ensure the secure transmission of the information about the first clock.

Similarly, the clock management network element may further send the identifier of the first terminal device to the third terminal device. In some cases, the clock management network element may further send the identifier of the second clock to the third terminal device. In some cases, the clock management network element may further send fourth security information to the third terminal device. The fourth security information is used by the third terminal device to decrypt information about the second clock that is obtained by the first terminal device through encryption.

Similarly, the clock management network element may further send an identifier of the fourth terminal device to the fifth terminal device. In some cases, the clock management network element may further send an identifier of the third clock to the fifth terminal device. In some cases, the clock management network element may further send fifth security information to the fifth terminal device. The fifth security information is used by the fifth terminal device to decrypt information about the third clock that is obtained by the fourth terminal device through encryption.

S260: The first terminal device sends the information about the first clock in the first terminal device group.

After receiving the first timing configuration information, the first terminal device sends the information about the first clock in the first terminal device group based on the first timing configuration information. The first terminal device group includes the second terminal device and the first terminal device. The information about the first clock is used as reference clock information (or reference time information) to perform timing for a terminal device in the first terminal device group.

In some embodiments, if only the first clock is deployed on the first terminal device, the first terminal device considers by default that an identifier of a terminal device included in the first timing configuration information is the identifier of the terminal device that requests the first timing precision. In other words, if the first timing configuration information received by the first terminal device includes the identifier of the second terminal device, the first terminal device considers by default that the second terminal device requests the first timing precision, and it may be determined that the first terminal device and the second terminal device form the first terminal device group. Further, the first terminal device sends the information about the first clock in the first terminal device group.

In some embodiments, if the first clock and the second clock are deployed on the first terminal device, and the first timing configuration information received by the first terminal device includes the identifier of the second terminal device and the identifier of the first clock, the first terminal device may determine, based on the first timing configuration information, that the second terminal device requests the first timing precision, and it may be determined that the first terminal device and the second terminal device form the first terminal device group. Further, the first terminal device sends the information about the first clock in the first terminal device group.

In some embodiments, if the first timing configuration information received by the first terminal device includes the identifier of the terminal device that requests the first timing precision, and the first timing configuration information further indicates to send the information about the first clock in the first terminal device group, the first terminal device may determine, based on the indication of the first timing configuration information, to send the information about the first clock in the first terminal device group.

It should be noted that, in the foregoing examples, although the first terminal device may first determine, based on the first timing configuration information, that the first terminal device and the second terminal device form the first terminal device group, the first terminal device is not limited to definitely determining the first terminal device group based on the first timing configuration information. For example, the first terminal device may directly send, based on the first timing configuration information, the information about the first clock to a terminal device corresponding to an identifier included in the first timing configuration information.

In some embodiments, if the first clock and the second clock are deployed on the first terminal device, and the first timing configuration information received by the first terminal device includes the identifier of the second terminal device, the method 200 further includes S261 to S263.

S261: The first terminal device sends the identifier of the first terminal device and the identifier of the at least one clock to the second terminal device. Accordingly, in S261, the second terminal device receives the identifier of the first terminal device and the identifier of the at least one clock.

It should be noted that, if the identifier of the at least one clock may be used by the second terminal device to determine the timing precision of the at least one clock, in S261, the first terminal device sends the identifier of the first terminal device and the identifier of the at least one clock to the second terminal device. If the identifier of the at least one clock cannot be used by the second terminal device to determine the timing precision of the at least one clock, in S261, the first terminal device sends the identifier of the first terminal device, the identifier of the at least one clock, and the timing precision of the at least one clock to the second terminal device.

It may be understood that, if the first timing configuration information further includes the identifier of the sixth terminal device, the first terminal device further sends the identifier of the first terminal device and the identifier of the at least one clock to the sixth terminal device.

S262: The second terminal device sends the identifier of the second terminal device and the identifier of the first clock to the first terminal device. Accordingly, in S262, the first terminal device receives the identifier of the second terminal device and the identifier of the first clock.

For example, after receiving the identifier of the first terminal device and the identifier of the at least one clock, the second terminal device determines the timing precision of the at least one clock based on the identifier of the at least one clock. Further, the second terminal device determines the identifier of the first clock from the identifier of the at least one clock, and then sends the identifier of the second terminal device and the identifier of the first clock to the first terminal device. In other words, when determining, based on the identifier of the at least one clock, that the at least one clock includes the first clock, the second terminal device sends the identifier of the second terminal device and the identifier of the first clock to the first terminal device.

For another example, after the second terminal device receives the identifier of the first terminal device, the identifier of the at least one clock, and the timing precision of the at least one clock, the second terminal device determines the identifier of the first clock from the identifier of the at least one clock, and then sends the identifier of the second terminal device and the identifier of the first clock to the first terminal device.

Similarly: after receiving the identifier of the first terminal device and the identifier of the at least one clock, the sixth terminal device determines the identifier of the first clock from the identifier of the at least one clock, and then sends the identifier of the sixth terminal device and the identifier of the first clock to the first terminal device.

S263: The first terminal device determines the first terminal device group based on the identifier of the second terminal device and the identifier of the first clock.

After receiving the identifier of the second terminal device and the identifier of the first clock, the first terminal device may determine that the second terminal device requests the first timing precision. Therefore, the first terminal device may determine that the first terminal device and the second terminal device form the first terminal device group. Further, the first terminal device sends the information about the first clock in the first terminal device group.

Similarly, if the first terminal device receives the identifier of the sixth terminal device and the identifier of the first clock, the first terminal device may determine that the sixth terminal device requests the first timing precision. Therefore, the first terminal device determines that the sixth terminal device also belongs to the first terminal device group.

Similarly: if the first terminal device further receives the second timing configuration information, the first terminal device further sends the information about the second clock in the second terminal device group based on the second timing configuration information.

For example, the first terminal device sends the information about the first clock in the first terminal device group in a unicast manner. That the first terminal device sends the information about the first clock to the second terminal device in the unicast manner is used as an example. If the first terminal device establishes a unicast connection to the second terminal device, the first terminal device may send the information about the first clock to the second terminal device through the unicast connection to the second terminal device. If the first terminal device does not establish a unicast connection to the second terminal device, the first terminal device first establishes a unicast connection to the second terminal device, and then the first terminal device sends the information about the first clock to the second terminal device through the unicast connection to the second terminal device. In a process of establishing the unicast connection between the first terminal device and the second terminal device, the first terminal device may initiate a unicast connection process, or the second terminal device may initiate a unicast connection process. In some cases, if S250 in the method 200 is performed, when receiving the identifier of the first terminal device, the second terminal device initiates the unicast connection process to the first terminal device based on the identifier of the first terminal device.

For another example, the first terminal device sends the information about the first clock in the first terminal device group in a multicast manner. It may be understood that when the first terminal device sends the information about the first clock in the multicast manner, only the terminal device in the first terminal device group can receive the information about the first clock sent by the first terminal device.

For still another example, the first terminal device sends the information about the first clock in a broadcast manner.

In some cases, before sending the information about the first clock, the first terminal device encrypts the information about the first clock based on the second security information, and sends the encrypted information about the first clock. It should be noted that, if the first terminal device sends the information about the first clock in the broadcast manner, after encrypting the information about the first clock based on the second security information, the first terminal device sends the encrypted information about the first clock in the broadcast manner.

In this embodiment of this application, when determining that the first clock is deployed on the first terminal device, the clock management network element sends the first timing configuration information to the first terminal device. The first timing configuration information includes the identifier of the second terminal device that requests the first timing precision. Therefore, the first terminal device can send, in the first terminal device group based on the first timing configuration information, the information about the first clock. The first terminal device group includes the first terminal device and the second terminal device. It may be understood that, the first terminal device sends the information about the first clock in the first terminal device group, and the first terminal device group includes the second terminal device that requests the first timing precision. Therefore, the first terminal device sends the information about the first clock to the second terminal device that requests the first timing precision, and does not send the information about the first clock to a terminal device that does not request the first timing precision, to optimize a timing manner and implement timing information isolation.

In addition, the clock management network element may determine, based on the subscription information of the second terminal device, whether the second terminal device subscribes to the clock service of the first timing precision, to avoid providing the second terminal device with the clock service that is of the high timing precision and that is not subscribed to by the second terminal device, and further implement the timing information isolation.

In addition, when the first terminal device group includes a plurality of terminal devices that request the first timing precision, if the first terminal device sends the information about the first clock in the first terminal device group in the multicast manner, signaling may be further reduced.

Figure 3:
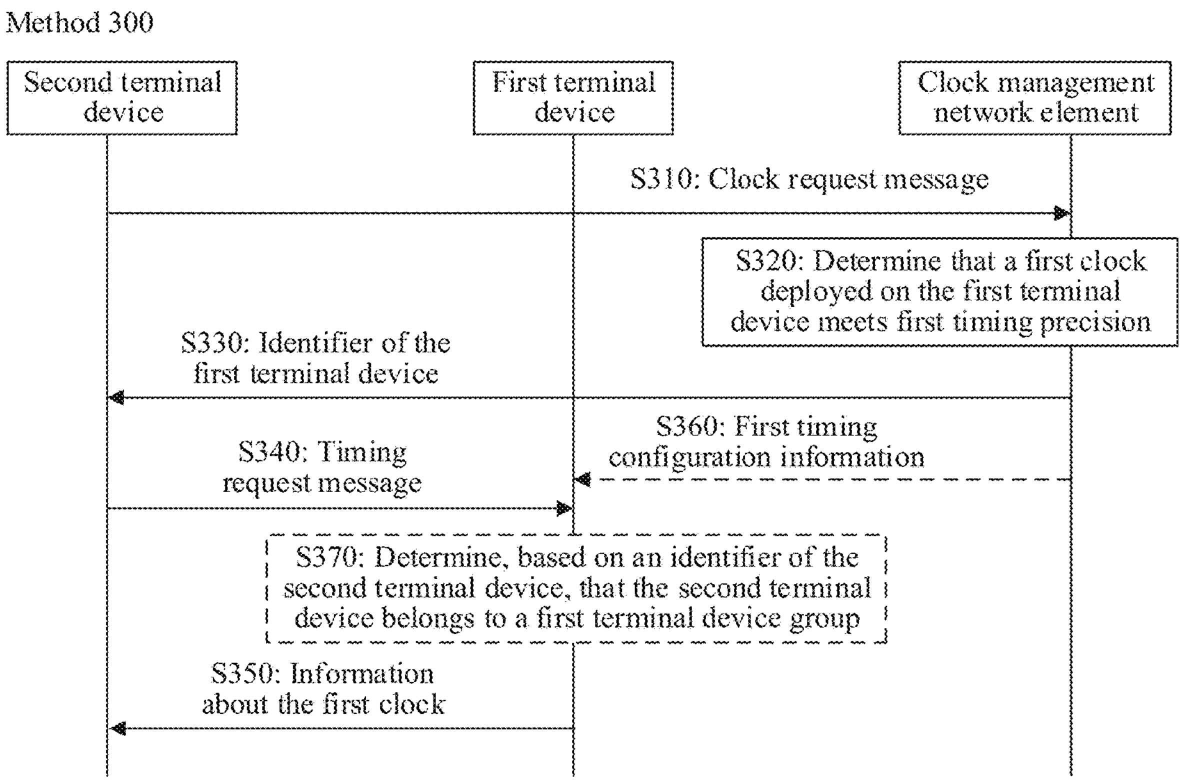
FIG. 3 is a schematic flowchart of a method according to an embodiment of this application.

FIG. 3 is a schematic flowchart of a timing method according to another embodiment of this application. The following describes in detail operations included in the method 300.

S310: A clock management network element receives a clock request message from at least one terminal device.

For example, the at least one terminal device includes a second terminal device that requests first timing precision. In other words, in S310, the clock management network element receives a clock request message #1 from the second terminal device. The clock request message #1 includes the first timing precision and an identifier of the second terminal device.

For more descriptions of S310, refer to S210 in the method 200. For brevity, details are not described herein again.

S320: The clock management network element determines that a first clock deployed on a first terminal device meets the first timing precision.

For descriptions of S320, refer to S220 in the method 200. For brevity, details are not described herein again.

In some cases, before S320, the method 300 further includes: The clock management network element determines, based on subscription information of the second terminal device, whether the second terminal device subscribes to a clock service of the first timing precision. If the second terminal device subscribes to the clock service of the first timing precision, the clock management network element continues to perform S320. If the second terminal device does not subscribe to the clock service of the first timing precision, the clock management network element does not perform S320. It should be understood that, when the clock management network element determines not to allow to provide, for the second terminal device, information about a clock that meets the first timing precision, the clock management network element does not perform S320, to avoid providing the second terminal device with a clock service that is of high timing precision and that is not subscribed to by the second terminal device.

S330: The clock management network element sends an identifier of the first terminal device to the second terminal device. Accordingly, in S330, the second terminal device receives the identifier of the first terminal device.

It should be understood that when determining that the first clock is deployed on the first terminal device, the clock management network element sends the identifier of the first terminal device to the second terminal device. Accordingly, after receiving the identifier of the first terminal device from the clock management network element, the second terminal device may determine that the first clock is deployed on the first terminal device.

In some cases, if a plurality of clocks with different timing precision are deployed on the first terminal device, in S330, the clock management network element further sends an identifier of the first clock to the second terminal device. Therefore, the second terminal device requests information about the first clock from the first terminal device based on the identifier of the first clock, to avoid a case in which the first terminal device sends information about another clock to the second terminal device, for example, avoid a case in which the first terminal device sends information about a second clock to the second terminal device.

In some cases, in S330, the clock management network element further sends first security information to the second terminal device. The first security information is used to decrypt information about the first clock that is obtained by the first terminal device through encryption. It should be understood that the clock management network element sends the first security information to the second terminal device. In this case, the first terminal device may send the encrypted information about the first clock to the second terminal device, to ensure secure transmission of the information about the first clock.

In some cases, if the first security information is allocated by the clock management network element, the method 300 further includes: The clock management network element sends second security information to the first terminal device. The second security information is used to encrypt the information about the first clock. It should be understood that the clock management network element sends the second security information to the first terminal device. In this case, the first terminal device is enabled to encrypt the information about the first clock based on the second security information, to ensure the secure transmission of the information about the first clock.

S340: The second terminal device sends a timing request message to the first terminal device. Accordingly, in S340, the first terminal device receives the timing request message from the second terminal device.

The timing request message includes the identifier of the second terminal device.

In some cases, if the second terminal device receives the identifier of the first clock from the clock management network element, the timing request message may further include the identifier of the first clock. The timing request message includes the identifier of the first clock, so that the first terminal device can determine that the second terminal device requests the information about the first clock.

In some embodiments, if the second terminal device establishes a unicast connection to the first terminal device before S340, the second terminal device sends the timing request message to the first terminal device through the unicast connection to the first terminal device.

In some embodiments, if the second terminal device does not establish the unicast connection to the first terminal device before S340, in S340, the second terminal device may send the timing request message to the first terminal device by using a direct communication request message. For example, the direct communication request message sent by the second terminal device to the first terminal device includes a request type field, and the request type field is timing. Accordingly, the first terminal device determines, based on the request type field in the direct communication request message, that the unicast connection initiated by the second terminal device is established for timing.

S350: The first terminal device sends the information about the first clock to the second terminal device. Accordingly, in S350, the second terminal device receives the information about the first clock.

For example, if only the first clock is deployed on the first terminal device, in S350, the first terminal device sends the information about the first clock to the second terminal device in response to the timing request message.

For another example, if a plurality of clocks are deployed on the first terminal device, and the timing request message includes the identifier of the first clock, in S350, the first terminal device sends the information about the first clock to the second terminal device based on the identifier of the first clock.

It should be noted that, if the second terminal device sends the timing request message to the first terminal device by using the direct communication request message, after establishing the unicast connection to the second terminal device based on the direct communication request message, the first terminal device sends the information about the first clock to the second terminal device through the unicast connection.

In some cases, after sending the information about the first clock, the first terminal device encrypts the information about the first clock based on the second security information, and sends the encrypted information about the first clock to the second terminal device. Accordingly, after receiving the encrypted information about the first clock, the second terminal device decrypts the encrypted information about the first clock based on the first security information.

In this embodiment of this application, when determining that the first clock is deployed on the first terminal device, the clock management network element sends the identifier of the first terminal device to the second terminal device, so that the second terminal device can request timing from the first terminal device based on the identifier of the first terminal device, instead of requesting timing from another terminal device. Therefore, the second terminal device can obtain only the information about the first clock, and cannot obtain information about another clock, to achieve timing information isolation.

In addition, the clock management network element may determine, based on the subscription information of the second terminal device, whether the second terminal device subscribes to the clock service of the first timing precision, to avoid providing the second terminal device with the clock service that is of the high timing precision and that is not subscribed to by the second terminal device, and further implement the timing information isolation.

In some cases, the method 300 may further include S360 and S370.

S360: The clock management network element sends first timing configuration information to the first terminal device. Accordingly, in S360, the first terminal device receives the first timing configuration information.

It should be understood that when determining that the first clock is deployed on the first terminal device, the clock management network element sends the first timing configuration information to the first terminal device. For more descriptions of the first timing configuration information, refer to S230. For brevity, details are not described herein again.

Further, before the first terminal device sends the information about the first clock to the second terminal device, the method 300 may further perform S370).

S370: The first terminal device determines, based on the identifier of the second terminal device, that the second terminal device belongs to a first terminal device group.

After the first terminal device receives the timing request message, if the identifier of the second terminal device included in the timing request message is consistent with an identifier of a terminal device included in the first terminal device group, the first terminal device may determine that the second terminal device belongs to the first terminal device group.

Further, when determining that the second terminal device belongs to the first terminal device group, the first terminal device sends the information about the first clock to the second terminal device.

In this embodiment of this application, when determining that the first clock is deployed on the first terminal device, the clock management network element sends the first timing configuration information to the first terminal device. The first timing configuration information includes the identifier of the second terminal device that requests the first timing precision. Therefore, the first terminal device can send the information about the first clock in the first terminal device group based on the first timing configuration information. The first terminal device group includes the first terminal device and the second terminal device. It may be understood that, because the first terminal device sends the information about the first clock in the first terminal device group, the first terminal device may send the information about the first clock to a terminal device requesting timing only when the terminal device requesting timing belongs to the first terminal device group, to implement the timing information isolation.

Figure 4:
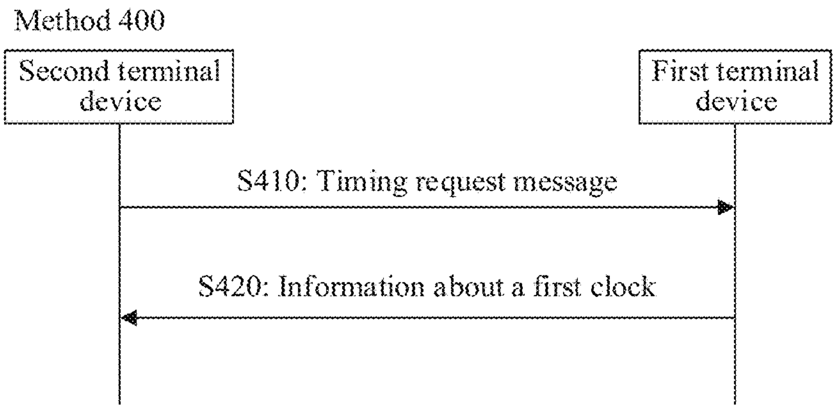
FIG. 4 is a schematic flowchart of a method according to an embodiment of this application.

FIG. 4 is a schematic flowchart of a timing method according to another embodiment of this application. The following describes in detail operations included in the method 400.

S410: A second terminal device sends a timing request message to a first terminal device. Accordingly, in S410, the first terminal device receives the timing request message from the second terminal device.

The timing request message includes an identifier of the second terminal device and first timing precision requested by the second terminal device.

The second terminal device may send the timing request message in a broadcast manner, or may send the timing request message in a unicast manner. This is not limited in this embodiment of this application.

S420: The first terminal device sends information about a first clock to the second terminal device. Accordingly, in S420, the second terminal device receives the information about the first clock from the first terminal device.

After receiving the timing request message, the first terminal device may determine, based on the timing request message, that the second terminal device requests the information about the first clock that meets the first timing precision. Further, if the first clock is deployed on the first terminal device, the first terminal device sends the information about the first clock to the second terminal device.

In some cases, if the first terminal device receives, from a plurality of terminal devices, timing request messages for requesting the first timing precision, the first terminal device may send the information about the first clock to the plurality of terminal devices in a multicast manner. For example, if the first terminal device further receives a timing request message from a sixth terminal device, and the sixth terminal device requests the first timing precision, the first terminal device sends the information about the first clock to the second terminal device and the sixth terminal device in the multicast manner.

In this embodiment of this application, the second terminal device includes the requested first timing precision in the timing request message, so that the first terminal device can send the information about the first clock to the second terminal device based on the timing request message, to implement timing information isolation. For example, if the first clock deployed on the first terminal device does not meet the first timing precision, the first terminal device does not send the information about the clock to the second terminal device. For another example, if a plurality of clocks are deployed on the first terminal device, for example, a clock that meets second timing precision is further deployed, the first terminal device sends only the information about the clock that meets the first timing precision to the second terminal device, and does not send information about the clock that meets the second timing precision.

Figure 5:
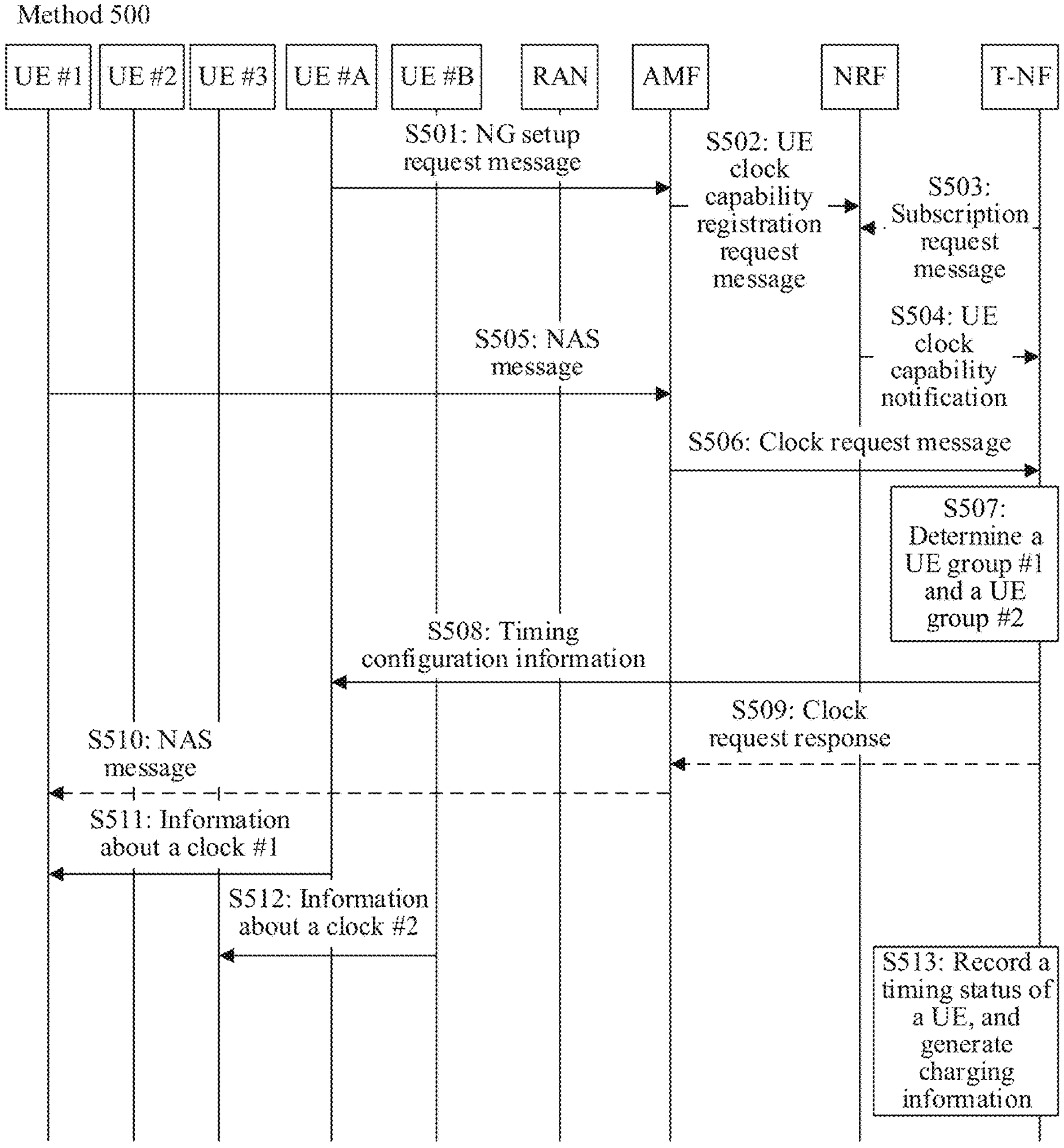
FIG. 5 is a schematic flowchart of a method according to an embodiment of this application.

With reference to FIG. 5, an example in which a clock is deployed on both a first terminal device (denoted as a UE #A below) and a fourth terminal device (denoted as a UE #B below) is used below to describe a timing method provided in an embodiment of this application.

The following describes in detail operations included in the method 500 shown in FIG. 5.

S501: The UE #A and the UE #B separately send an NG setup request message to an access and mobility management function network element (denoted as an AMF below).

For example, the UE #A sends an NG setup request message #1 to a RAN, and then the RAN forwards the NG setup request message #1 to the AMF. The NG setup request message #1 includes clock capability information of the UE #A, and the clock capability information of the UE #A includes an identifier of the UE #A and timing precision of a first clock (denoted as a clock #1 below) deployed on the UE #A. In some cases, the clock capability information of the UE #A further includes security information #1 (that is, first security information). The security information #1 is used to decrypt information about the clock #1 (that is, information about the first clock) that is obtained by the UE #A through encryption.

For example, the UE #B sends an NG setup request message #2 to the RAN, and then the RAN forwards the NG setup request message #2 to the AMF. The NG setup request message #2 includes clock capability information of the UE #B, and the clock capability information of the UE #B includes an identifier of the UE #B and timing precision of a third clock (denoted as a clock #2 below) deployed on the UE #B. In some cases, the clock capability information of the UE #B further includes security information #2. The security information #2 is used to decrypt information about the clock #2 that is obtained by the UE #B through encryption.

S502: The AMF sends a UE clock capability registration request message to a network repository function network element (denoted as an NRF below).

For example, after receiving the NG setup request message #1, the AMF may send a UE clock capability registration request message #1 to the NRF. The UE clock capability registration request message #1 includes the clock capability information of the UE #A.

For example, after receiving the NG setup request message #2, the AMF may send a UE clock capability registration request message #1 to the NRF. The UE clock capability registration request message #2 includes the clock capability information of the UE #B.

For another example, after receiving the NG setup request message #1 and the NG setup request message #2, the AMF may send a UE clock capability registration request message #3 to the NRF. The UE clock capability registration request message #3 includes the clock capability information of the UE #A and the clock capability information of the UE #B.

In some cases, the method 500 further includes S503: A clock management network element (denoted as a T-NF below) sends a subscription request message to the NRF.

The subscription request message is used to request to subscribe to a clock capability of a UE.

S504: The NRF sends a UE clock capability notification to the T-NF.

For example, after receiving the UE clock capability registration request message #1 from the AMF, the NRF sends a UE clock capability notification #1 to the T-NF. The UE clock capability notification #1 includes the clock capability information of the UE #A.

For another example, after receiving the UE clock capability registration request message #2 from the AMF, the NRF sends a UE clock capability notification #2 to the T-NF. The UE clock capability notification #2 includes the clock capability information of the UE #B.

For still another example, the NRF receives the UE clock capability registration request message #1 and the UE clock capability registration request message #2 from the AMF, or receives the UE clock capability registration request message #3, and the NRF sends a UE clock capability notification #3 to the T-NF. The UE clock capability notification #3 includes the clock capability information of the UE #A and the clock capability information of the UE #B.

S505: A UE #1 to a UE #3 separately send a non-access stratum (NAS) message to the AMF.

The NAS message may be a registration request message or a packet data unit (PDU) session establishment request message.

For example, the UE #1 (an example of a second terminal device) sends a NAS message #1 to the AMF. The NAS message #1 includes a clock request message #1, and the clock request message #1 includes an identifier of the UE #1 and first timing precision requested by the UE #1.

For example, the UE #2 sends a NAS message #2 to the AMF. The NAS message #2 includes a clock request message #2, and the clock request message #2 includes an identifier of the UE #2 and first timing precision requested by the UE #2.

For example, the UE #3 sends a NAS message #3 to the AMF. The NAS message #3 includes a clock request message #3, and the clock request message #3 includes an identifier of the UE #3 and third timing precision requested by the UE #3.

S506: The AMF sends a clock request message to the T-NF.

For example, the AMF sends the clock request message #1 to the T-NF based on the NAS message #1.

For example, the AMF sends the clock request message #2 to the T-NF based on the NAS message #2.

For example, the AMF sends the clock request message #3 to the T-NF based on the NAS message #3.

S507: The T-NF determines a UE group #1 and a UE group #2.

After receiving the clock request message #1 to the clock request message #3, the T-NF compares timing precision requested by the UE #1 to the UE #3 with timing precision of clocks deployed on the UE #A and the UE #B, may determine that the timing precision of the clock #1 deployed on the UE #A may meet the first timing precision requested by the UE #1 and the UE #2, and may determine that the timing precision of the clock #2 deployed on the UE #B may meet the third timing precision requested by the UE #3. Further, the T-NF determines the UE #A, the UE #1, and the UE #2 as the UE group #1, and determines the UE #B and the UE #3 as the UE group #2.

S508: The T-NF separately sends timing configuration information to the UE #A and the UE #B.

For example, the T-NF sends timing configuration information #1 to the UE #A. The timing configuration information #1 includes the identifier of the UE #1 and the identifier of the UE #2. In some cases, the timing configuration information #1 further includes security information #3 (that is, second security information). The security information #3 is used to encrypt information about the clock #1.

For example, the T-NF sends timing configuration information #2 to the UE #B. The timing configuration information #2 includes the identifier of the UE #3. In some cases, the timing configuration information #2 further includes security information #4. The security information #4 is used to encrypt information about the clock #2.

In some cases, the method 500 may further include S509 and S510.

S509: The T-NF sends a clock request response to the AMF.

The T-NF sends a clock request response #1 of the clock request message #1 to the AMF. The clock request response #1 includes the identifier of the UE #A. In some cases, the clock request response #1 further includes the security information #1.

The T-NF sends a clock request response #2 of the clock request message #2 to the AMF. The clock request response #2 includes the identifier of the UE #A. In some cases, the clock request response #1 further includes the security information #1.

The T-NF sends a clock request response #3 of the clock request message #3 to the AMF. The clock request response #3 includes the identifier of the UE #B. In some cases, the clock request response #1 further includes the security information #2.

S510: The AMF separately sends a NAS message to the UE #1 to the UE #3.

The NAS message may be a registration accept message or a PDU session establishment accept message.

The AMF sends a NAS message #4 to the UE #1 based on the clock request response #1. The NAS message #4 includes the identifier of the UE #A. In some cases, the NAS message #4 further includes the security information #1.

The AMF sends a NAS message #5 to the UE #2 based on the clock request response #2. The NAS message #5 includes the identifier of the UE #A. In some cases, the NAS message #5 further includes the security information #1.

The AMF sends a NAS message #6 to the UE #3 based on the clock request response #3. The NAS message #6 includes the identifier of the UE #A. In some cases, the NAS message #6 further includes the security information #2.

S511: The UE #A sends the information about the clock #1 to the UE #1 and/or the UE #2.

The UE #A determines, based on the received timing configuration information #1, to send the information about the clock #1 in the UE group #1. For more descriptions of S511, refer to S270 in the foregoing method 200.

S512: The UE #B sends the information about the clock #2 to the UE #3.

The UE #B determines, based on the received timing configuration information #2, to send the information about the clock #2 in the UE group #2. For more descriptions of S512, refer to S270 in the foregoing method 200.

S513: The T-NF records a timing status of the UE, and generates charging information.

In this embodiment of this application, after receiving a plurality of clock request messages, the T-NF groups UEs having a same timing request and a UE that can meet the timing request into a same UE group, so that the UE on which a clock is deployed can perform timing for the UEs in the same UE group, to implement timing information isolation.

Figure 6:
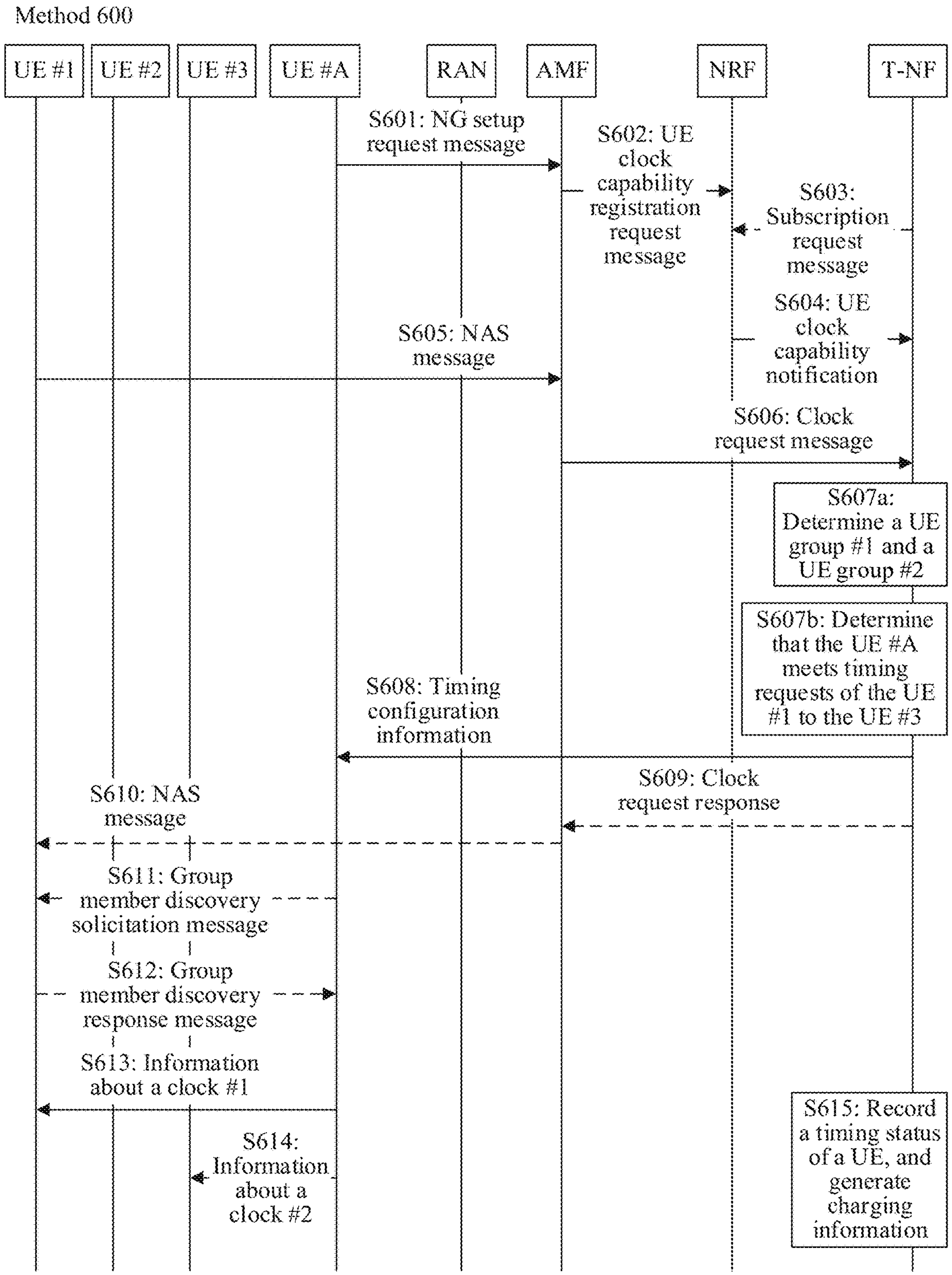
FIG. 6 is a schematic flowchart of a method according to an embodiment of this application.

With reference to FIG. 6, an example in which two clocks (denoted as a clock #1 and a clock #2) are deployed on a first terminal device (denoted as a UE #A below) is used below to describe a timing method provided in an embodiment of this application.

The following describes in detail operations included in the method 600 shown in FIG. 6.

S601: The UE #A sends an NG setup request message to an access and mobility management function network element (denoted as an AMF below).

For example, the UE #A sends the NG setup request message to a RAN, and then the RAN forwards the NG setup request message to the AMF. The NG setup request message includes clock capability information of the UE #A. The clock capability information of the UE #A includes an identifier of the UE #A, timing precision of a first clock (denoted as a clock #1 below) deployed on the UE #A, a clock domain number of the clock #1, timing precision of a second clock (denoted as a clock #2 below) deployed on the UE #A, and a clock domain number of the clock #2. In some cases, the clock capability information of the UE #A further includes security information #1 (that is, first security information) and security information #2. The security information #1 is used to decrypt information about the clock #1 (that is, information about the first clock) that is obtained by the UE #A through encryption, and the security information #2 is used to decrypt information about the clock #2 (that is, information about the second clock) that is obtained by the UE #A through encryption.

S602: The AMF sends a UE clock capability registration request message to a network repository function network element (denoted as an NRF below).

After receiving the NG setup request message, the AMF may send the UE clock capability registration request message to the NRF. The UE clock capability registration request message includes the clock capability information of the UE #A.

In some cases, the method 600 further includes S603: A clock management network element (denoted as a T-NF below) sends a subscription request message to the NRF.

The subscription request message is used to request to subscribe to a clock capability of a UE.

S604: The NRF sends a UE clock capability notification to the T-NF.

For example, after receiving the UE clock capability registration request message from the AMF, the NRF sends the UE clock capability notification to the T-NF. A UE clock capability notification #1 includes the clock capability information of the UE #A.

S605 and S606 are the same as S505 and S506 in the method 500.

Further. S607*a* or S607*b* in the method 600 is performed.

S607*a*: The T-NF determines a UE group #1 and a UE group #2.

After receiving a clock request message #1 to a clock request message #3, the T-NF compares timing precision requested by a UE #1 to a UE #3 with timing precision of a clock deployed on the UE #A, may determine that the timing precision of the clock #1 deployed on the UE #A may meet first timing precision requested by the UE #1 and the UE #2, and may determine that the timing precision of the clock #2 deployed on the UE #A may meet third timing precision requested by the UE #3. Further, the T-NF determines the UE #A, the UE #1, and the UE #2 as the UE group #1, and determines the UE #A and the UE #3 as the UE group #2.

S607*b*: The T-NF determines that the UE #A meets timing requests of the UE #1 to the UE #3.

After receiving the clock request message #1 to the clock request message #3, the T-NF compares the timing precision requested by the UE #1 to the UE #3 with the timing precision of the clock deployed on the UE #A, may determine that the timing precision of the clock #1 deployed on the UE #A may meet the first timing precision requested by the UE #1 and the UE #2, and may determine that the timing precision of the clock #2 deployed on the UE #A may meet the third timing precision requested by the UE #3.

S608: The T-NF sends timing configuration information to the UE #A.

If S607*a* in the method 600 is performed, the timing configuration information includes an identifier of the UE #1, an identifier of the UE #2, an identifier of the UE #3, the clock domain number of the clock #1, and the clock domain number of the clock #2. The identifier of the UE #1 and the identifier of the UE #2 are associated with the clock domain number of the clock #1, to indicate that the UE #1, the UE #2, and the UE #A all belong to the UE group #1. The identifier of the UE #3 is associated with the clock domain number of the clock #2, to indicate that the UE #3 and the UE #A belong to the UE group #2.

If S607*b* in the method 600 is performed, the timing configuration information includes the identifier of the UE #1, the identifier of the UE #2, and the identifier of the UE #3.

In some cases, the timing configuration information further includes security information #3 (that is, the second security information) and/or security information #4. The security information #3 is used to encrypt information about the clock #1, and the security information #4 is used to encrypt information about the clock #2.

In some cases, the method 600 may further include S609 and S610, S609 and S610 are the same as S509 and S510 in the method 500.

Further, if the timing configuration information received by the UE #A indicates that the UE #1, the UE #2, and the UE #A belong to the UE group #1, and indicates that the UE #3 and the UE #B belong to the UE group #2, after receiving the timing configuration information, the UE #A may directly determine, based on the timing configuration information, to send the information about the clock #1 in the UE group #1 and to send the information about the clock #2 in the UE group #2. In other words, after S608 in the method 600 is performed, S613 and/or S614 may be directly performed.

If the timing configuration information received by the UE #A includes the identifiers of the UE #1 to the UE #3, but does not include the clock domain number, the method 600 further includes S612 and S613.

S612: The UE #A sends a group member discovery solicitation message to the UE #1 to the UE #3.

The group member discovery solicitation message includes the identifier of the UE #A, the timing precision of the clock #1, the clock domain number of the clock #1, the timing precision of the clock #2, and the clock domain number of the clock #2.

S613: The UE #1 to the UE #3 separately send a group member discovery response message to the UE #A.

For example, after receiving the group member discovery solicitation message, the UE #1 determines that the timing precision of the clock #1 meets the first timing precision requested by the UE #1. In this case, the UE #1 sends a group member discovery response message #1 to the UE #A. The group member discovery response message #1 includes the identifier of the UE #1 and the clock domain number of the clock #1.

After receiving the group member discovery solicitation message, the UE #2 determines that the timing precision of the clock #1 meets the first timing precision requested by the UE #2. In this case, the UE #2 sends a group member discovery response message #2 to the UE #A. The group member discovery response message #2 includes the identifier of the UE #2 and the clock domain number of the clock #1.

After receiving the group member discovery solicitation message, the UE #3 determines that the timing precision of the clock #2 meets first timing precision requested by the UE #3. In this case, the UE #3 sends a group member discovery response message #3 to the UE #A. The group member discovery response message #3 includes the identifier of the UE #3 and the clock domain number of the clock #2.

Accordingly, after receiving the group member discovery response message #1 to the group member discovery response message #3, the UE #A may determine that the UE #1 and the UE #2 request the first timing precision, and determine that the UE #3 requests the second timing precision. Therefore, the UE #A may determine that the UE #A, the UE #1, and the UE #2 form the UE group #1, and determine that the UE #A and the UE #3 form the UE group #2.

S613: The UE #A sends the information about the clock #1 in the UE group #1.

S614: The UE #A sends the information about the clock #2 in the UE group #2.

For more descriptions of S613 and S614, refer to S270 in the foregoing method 200.

S615: The T-NF records a timing status of the UE, and generates charging information.

In this embodiment of this application, after receiving a plurality of clock request messages, the T-NF groups UEs having a same timing request and the UE #A that can meet the timing request into a same UE group, and when a plurality of clocks are deployed on the UE #A, the T-NF associates a clock domain number of a clock that meets the timing request with the UE group, so that the UE #A can perform timing for the UEs in the same UE group, to implement timing information isolation.

Alternatively: when the UE #A can meet timing requests of a plurality of UEs, identifiers of the plurality of UEs are sent to the UE #A, so that the UE #A can send group member discovery solicitation messages to the plurality of UEs based on the identifiers of the plurality of UEs, and group UEs having a same timing request into a same UE group based on group member discovery response messages fed back by the plurality of UEs. Therefore, the UE #A can perform timing for the UEs in the same UE group, to implement timing information isolation.

Figure 7:
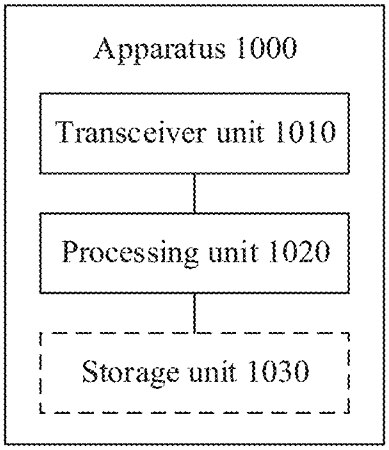
FIG. 7 is a diagram of a communication apparatus according to an embodiment of this application.

FIG. 7 is a block diagram of a communication apparatus 1000 according to an embodiment of this application. As shown in the figure, the communication apparatus 1000 may include a transceiver unit 1010 and a processing unit 1020.

In some embodiments, the communication apparatus 1000 may be the first terminal device in the foregoing method embodiments, or may be a chip configured to implement a function of the first terminal device in the foregoing method embodiments.

It should be understood that the communication apparatus 1000 may correspond to the first terminal device in the method 200, the method 300, the method 400, the method 500, or the method 600 in embodiments of this application. The communication apparatus 1000 may include units configured to perform the methods performed by the first terminal device in the method 200 in FIG. 2, the method 300 in FIG. 3, the method 400 in FIG. 4, the method 500 in FIG. 5, or the method 600 in FIG. 6. In addition, the units in the communication apparatus 1000 and the foregoing other operations and/or functions are respectively used to implement corresponding procedures of the method 200 in FIG. 2, the method 300 in FIG. 3, the method 400 in FIG. 4, the method 500 in FIG. 5, or the method 600 in FIG. 6. It should be understood that an example process in which the units perform the foregoing corresponding operations is described in detail in the foregoing method embodiments. For brevity, details are not described herein.

In some embodiments, the communication apparatus 1000 may be the second terminal device in the foregoing method embodiments, or may be a chip configured to implement a function of the second terminal device in the foregoing method embodiments.

It should be understood that the communication apparatus 1000 may correspond to the second terminal device in the method 200, the method 300, the method 400, the method 500, or the method 600 in embodiments of this application. The communication apparatus 1000 may include units configured to perform the methods performed by the second terminal device in the method 200 in FIG. 2, the method 300 in FIG. 3, the method 400 in FIG. 4, the method 500 in FIG. 5, or the method 600 in FIG. 6. In addition, the units in the communication apparatus 1000 and the foregoing other operations and/or functions are respectively used to implement corresponding procedures of the method 200 in FIG. 2, the method 300 in FIG. 3, the method 400 in FIG. 4, the method 500 in FIG. 5, or the method 600 in FIG. 6. It should be understood that an example process in which the units perform the foregoing corresponding operations is described in detail in the foregoing method embodiments. For brevity, details are not described herein.

In some embodiments, the communication apparatus 1000 may be the clock management network element in the foregoing method embodiments, or may be a chip configured to implement a function of the clock management network element in the foregoing method embodiments.

It should be understood that the communication apparatus 1000 may correspond to the clock management network element in the method 200, the method 300, the method 400, the method 500), or the method 600 in embodiments of this application. The communication apparatus 1000 may include units configured to perform the methods performed by the clock management network element in the method 200 in FIG. 2, the method 300 in FIG. 3, the method 400) in FIG. 4, the method 500 in FIG. 5, or the method 600 in FIG. 6. In addition, the units in the communication apparatus 1000 and the foregoing other operations and/or functions are respectively used to implement corresponding procedures of the method 200 in FIG. 2, the method 300 in FIG. 3, the method 400 in FIG. 4, the method 500 in FIG. 5, or the method 600 in FIG. 6. It should be understood that an example process in which the units perform the foregoing corresponding operations is described in detail in the foregoing method embodiments. For brevity, details are not described herein.

Figure 8:
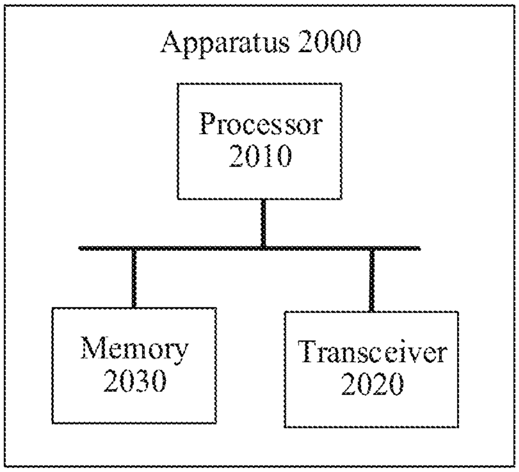
FIG. 8 is a block diagram of a communication device according to an embodiment of this application.

It should be further understood that the transceiver unit 1010 in the communication apparatus 1000 may correspond to a transceiver 2020 in a communication device 2000 shown in FIG. 8, and the processing unit 1020 in the communication apparatus 1000 may correspond to a processor 2010 in the communication device 2000 shown in FIG. 8.

It should be further understood that when the communication apparatus 1000 is a chip, the chip includes a transceiver unit. In some cases, the chip may further include a processing unit. The transceiver unit may be an input/output circuit or a communication interface. The processing unit may be a processor, a microprocessor, or an integrated circuit that is integrated on the chip.

The transceiver unit 1010 is configured to implement signal receiving and sending operations of the communication apparatus 1000, and the processing unit 1020 is configured to implement a signal processing operation of the communication apparatus 1000.

In some cases, the communication apparatus further includes a storage unit 1030, and the storage unit 1030 is configured to store instructions.

FIG. 8 is a block diagram of a communication device 2000 according to an embodiment of this application. As shown in FIG. 8, the communication device 2000 includes at least one processor 2010 and a transceiver 2020. The processor 2010 is coupled to a memory, and is configured to execute instructions stored in the memory, to control the transceiver 2020 to send a signal and/or receive a signal. In some cases, the communication device 2000 further includes a memory 2030, configured to store instructions.

It should be understood that the processor 2010 and the memory 2030 may be integrated into one processing apparatus. The processor 2010 is configured to execute program code stored in the memory 2030 to implement the foregoing functions. In some cases, the memory 2030 may alternatively be integrated into the processor 2010, or may be independent of the processor 2010.

It should be further understood that the transceiver 2020 may include a receiver (or referred to as a receive machine) and a transmitter (or referred to as a transmit machine). The transceiver 2020 may further include an antenna. There may be one or more antennas. The transceiver 2020 may further be an antenna interface or an interface circuit.

When the communication device 2000 is a chip, the chip includes a transceiver unit and a processing unit. The transceiver unit may be an input/output circuit or a communication interface. The processing unit may be a processor, a microprocessor, or an integrated circuit that is integrated on the chip.

Figure 9:
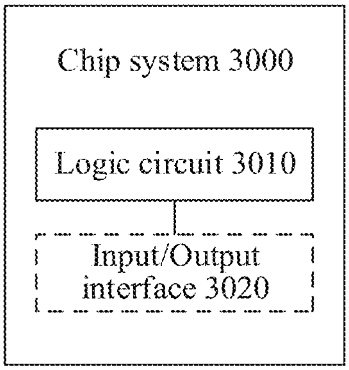
FIG. 9 is a diagram of a chip system according to an embodiment of this application.

FIG. 9 is a diagram of a chip system according to an embodiment of this application. The chip system herein may alternatively be a system composed of circuits. The chip system 3000 shown in FIG. 9 includes a logic circuit 3010 and an input/output interface 3020. The logic circuit is configured to be coupled to an input interface, and transmit data (for example, first timing configuration information) through the input/output interface, to perform the methods shown in FIG. 2 to FIG. 6.

An embodiment of this application further provides a processing apparatus, including a processor and an interface. The processor may be configured to perform the methods in the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

In some embodiments, the operations of the foregoing methods may be implemented by using a hardware integrated logical circuit in the processor, or by using instructions in a form of software. The operations of the method disclosed with reference to embodiments of this application may be directly executed and accomplished by using a hardware processor, or may be executed and accomplished by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory; and the processor reads information in the memory and completes the operations in the foregoing methods in combination with hardware of the processor. To avoid repetition, details are not described herein again.

It should be noted that the processor in embodiments of this application may be an integrated circuit chip, and has a signal processing capability. In an example process, the operations in the foregoing method embodiments may be implemented by using the hardware integrated logical circuit in the processor, or by using the instructions in the form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, operations, and logical block diagrams that are disclosed in embodiments of this application. The general-purpose processor may be a microprocessor, or the processor may be any conventional processor or the like.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

According to the method provided in embodiments of this application, this application further provides a computer program product. The computer program product includes computer program code. When the computer program code is run on a computer, the computer is enabled to perform the method according to any one of the embodiments shown in FIG. 2 to FIG. 6.

According to the method provided in embodiments of this application, this application further provides a computer-readable medium. The computer-readable medium stores program code. When the program code is run on a computer, the computer is enabled to perform the method according to any one of the embodiments shown in FIG. 2 to FIG. 6.

According to the method provided in embodiments of this application, this application further provides a system, including the foregoing first terminal device, clock management network element, and second terminal device.

All or some of the foregoing embodiments may be implemented by using software, hardware, firmware, or any combination thereof. When the software is used, all or some of the embodiments may be implemented in a form of a computer program product. The computer program product includes one or more computer instructions. When the computer instructions are loaded and executed on a computer, the procedures or functions according to embodiments of this application are all or partially generated. The computer instructions may be stored in a computer-readable storage medium, or may be transmitted from one computer-readable information medium to another computer-readable storage medium. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid state disc (SSD)), or the like.

In several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are examples of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of timing operations in wireless communications, the method comprising:

receiving, by a clock management network element, a clock request message from at least one terminal device, wherein the clock request message comprises an identifier of the terminal device and timing precision requested by the terminal device, and the at least one terminal device comprises a second terminal device that requests first timing precision;

determining, by the clock management network element, that a first clock deployed on a first terminal device meets the first timing precision;

sending, by the clock management network element, first timing configuration information to the first terminal device, wherein the first timing configuration information comprises an identifier of the second terminal device, and wherein when a second clock that meets second timing precision is further deployed on the first terminal device; and determining a first terminal device group based on the clock request message and the first timing configuration information, the first terminal device group including the first terminal device and a terminal device requesting the first timing precision in the at least one terminal device, wherein the determining comprises:

sending, by the first terminal device, an identifier of the first terminal device and an identifier of at least one clock to the second terminal device based on the first timing configuration information;

receiving, by the first terminal device, the identifier of the second terminal device and an identifier of the first clock from the second terminal device; and determining, by the first terminal device based on the identifier of the second terminal device and the identifier of the first clock, that the first terminal device group comprises the first terminal device and the second terminal device.

2. The method according to claim 1, wherein the terminal device that requests the first timing precision in the at least one terminal device comprises the second terminal device; and the first timing configuration information indicates to send information about the first clock in the first terminal device group, and the first timing configuration information comprises an identifier of the terminal device that requests the first timing precision in the at least one terminal device.

3. The method according to claim 1, further comprising:

determining, by the clock management network element based on subscription information of the second terminal device, that the second terminal device subscribes to a clock service of the first timing precision.

4. The method according to claim 1, further comprising:

sending, by the clock management network element, an identifier of the first terminal device to the second terminal device.

5. The method according to claim 1, further comprising:

determining, by the clock management network element, that a second clock that meets second timing precision is further deployed on the first terminal device.

6. The method according to claim 5, further comprising:

sending, by the clock management network element, an identifier of the first clock to the second terminal device.

7. The method according to claim 5, wherein the at least one terminal device further comprises a third terminal device that requests the second timing precision, and the method further comprises:

sending, by the clock management network element, second timing configuration information to the first terminal device, wherein the second timing configuration information comprises an identifier of the third terminal device and an identifier of the second clock.

8. A method of timing operations in wireless communications, the method comprising:

receiving, by a first terminal device, first timing configuration information from a clock management network element, wherein the first timing configuration information comprises an identifier of a second terminal device;

determining, by the first terminal device, a first terminal device group based on the first timing configuration information, wherein the first terminal device group comprises the first terminal device and the second terminal device; and sending, by the first terminal device, information about a first clock in the first terminal device group, wherein the first clock is a clock that is deployed on the first terminal device and that meets first timing precision, wherein when a second clock that meets second timing precision is further deployed on the first terminal device, the determining, by the first terminal device, the first terminal device group based on the first timing configuration information comprises:

sending, by the first terminal device, an identifier of the first terminal device and an identifier of at least one clock to the second terminal device based on the first timing configuration information;

receiving, by the first terminal device, the identifier of the second terminal device and an identifier of the first clock from the second terminal device; and determining, by the first terminal device based on the identifier of the second terminal device and the identifier of the first clock, that the first terminal device group comprises the first terminal device and the second terminal device.

9. The method according to claim 8, wherein the first timing configuration information indicates to send the information about the first clock in the first terminal device group.

10. The method according to claim 8, wherein the sending, by the first terminal device, information about a first clock in the first terminal device group comprises: receiving, by the first terminal device, a timing request message from the second terminal device, wherein the timing request message comprises the identifier of the second terminal device; determining, by the first terminal device based on the identifier of the second terminal device, that the second terminal device belongs to the first terminal device group; and sending, by the first terminal device, the information about the first clock to the second terminal device.

11. The method according to claim 8, wherein the sending, by the first terminal device, information about a first clock in the first terminal device group comprises: sending, by the first terminal device, the information about the first clock to a terminal device in the first terminal device group in a multicast manner.

12. The method according to claim 8, wherein when a second clock that meets second timing precision is further deployed on the first terminal device, the first timing configuration information further comprises an identifier of the first clock.

13. The method according to claim 12, further comprising:

receiving, by the first terminal device, second timing configuration information from the clock management network element, wherein the second timing configuration information comprises an identifier of a third terminal device;

determining, by the first terminal device, a second terminal device group based on the second timing configuration information, wherein the second terminal device group comprises the first terminal device and the third terminal device; and sending, by the first terminal device, information about the second clock in the second terminal device group.

14. The method according to claim 8, further comprising:

sending, by the first terminal device, clock capability information to an access and mobility management function network element, wherein the clock capability information comprises the identifier of the first terminal device and at least one of the following: timing precision of the at least one clock, the identifier of the at least one clock, and at least one piece of security information used to decrypt information about the at least one clock that is obtained by the first terminal device through encryption.

15. A communication apparatus, comprising at least one processor, wherein the at least one processor is configured to execute a computer program stored in a memory, to enable the apparatus to perform:

receiving first timing configuration information from a clock management network element, wherein the first timing configuration information comprises an identifier of a second terminal device;

determining a first terminal device group based on the first timing configuration information, wherein the first terminal device group comprises the first terminal device and the second terminal device; and sending information about a first clock in the first terminal device group, wherein the first clock is a clock that is deployed on the first terminal device and that meets first timing precision, wherein when a second clock that meets second timing precision is further deployed on the first terminal device, the determining, by the first terminal device, the first terminal device group based on the first timing configuration information comprises:

sending, by the first terminal device, an identifier of the first terminal device and an identifier of at least one clock to the second terminal device based on the first timing configuration information;

receiving, by the first terminal device, the identifier of the second terminal device and an identifier of the first clock from the second terminal device; and determining, by the first terminal device based on the identifier of the second terminal device and the identifier of the first clock, that the first terminal device group comprises the first terminal device and the second terminal device.

16. The communication apparatus according to claim 15, wherein the communication apparatus is further to perform:

receiving a timing request message from the second terminal device, wherein the timing request message comprises the identifier of the second terminal device;

determining based on the identifier of the second terminal device, that the second terminal device belongs to the first terminal device group; and sending the information about the first clock to the second terminal device.

17. The communication apparatus according to claim 15, wherein when a second clock that meets second timing precision is further deployed on the first terminal device, the communication apparatus is further to perform:

sending an identifier of the first terminal device and an identifier of at least one clock to the second terminal device based on the first timing configuration information;

receiving the identifier of the second terminal device and an identifier of the first clock from the second terminal device; and determining based on the identifier of the second terminal device and the identifier of the first clock, that the first terminal device group comprises the first terminal device and the second terminal device.

18. The communication apparatus according to claim 15, wherein when a second clock that meets second timing precision is further deployed on the first terminal device, the first timing configuration information further comprises an identifier of the first clock, and the communication apparatus is further to perform:

receiving second timing configuration information from the clock management network element, wherein the second timing configuration information comprises an identifier of a third terminal device;

determining a second terminal device group based on the second timing configuration information, wherein the second terminal device group comprises the first terminal device and the third terminal device; and sending information about the second clock in the second terminal device group.

19. The communication apparatus according to claim 15, wherein the communication apparatus is further to perform:

sending clock capability information to an access and mobility management function network element, wherein the clock capability information comprises the identifier of the first terminal device and at least one of the following:

timing precision of the at least one clock, the identifier of the at least one clock, and at least one piece of security information used to decrypt information about the at least one clock that is obtained by the first terminal device through encryption.

* * * * *